(12) United States Patent  
Kim et al.

(10) Patent No.: US 12,126,387 B2  
(45) Date of Patent: Oct. 22, 2024

(54) METHOD AND DEVICE FOR CORRECTING POLARIZATION DISTORTION IN PLUG AND PLAY QUANTUM KEY DISTRIBUTION SYSTEM

(71) Applicant: LG ELECTRONICS INC., Seoul (KR)

(72) Inventors: JaYeong Kim, Seoul (KR); Byungkyu Ahn, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 18/014,052

(22) PCT Filed: Jul. 2, 2020

(86) PCT No.: PCT/KR2020/008683  
§ 371 (c)(1),  
(2) Date: Dec. 30, 2022

(87) PCT Pub. No.: WO2022/004921  
PCT Pub. Date: Jan. 6, 2022

(65) Prior Publication Data  
US 2024/0039641 A1 Feb. 1, 2024

(51) Int. Cl.  
*H04B 10/70* (2013.01)  
*H04B 10/077* (2013.01)  
*H04L 9/08* (2006.01)

(52) U.S. Cl.  
CPC ........... *H04B 10/70* (2013.01); *H04B 10/077* (2013.01); *H04L 9/0852* (2013.01)

(58) Field of Classification Search  
CPC .................................................. H04B 10/70  
See application file for complete search history.

(56) References Cited

U.S. PATENT DOCUMENTS 10,724,922 B1 * 7/2020 Yao ........................ G02B 6/024  
2015/0341974 A1   11/2015 Wu et al.  
(Continued)

OTHER PUBLICATIONS

Tysowski et al., "The engineering of a scalable multi-site communications system utilizing quantum key distribution (QKD)", Quantum Sci. Technol. 3, 2018 (Year: 2018).*

(Continued)

*Primary Examiner* — Shi K Li  
(74) *Attorney, Agent, or Firm* — LEE, HONG, DEGERMAN, KANG & WAIMEY

(57) ABSTRACT

Provided are a device and a method performed by the device to correct an error in a quantum communication system. The method is characterized by comprising: transmitting a random access (RA) preamble to another device; receiving a random access response (RAR) from the other device as a response to the RA preamble; performing a radio resource control (RRC) connection procedure with the other device; and transmitting data to the other device, wherein the data is encoded on the basis of key information, the error is measured on the basis of a test pulse, and the key information is distributed to the device and the other device on the basis of the error being corrected using an improved Faraday rotator mirror of the device.

14 Claims, 49 Drawing Sheets

(56) References Cited

U.S. PATENT DOCUMENTS

| | | |
|---|---|---|
| 2020/0204362 A1 | 6/2020 | Li et al. |
| 2023/0122950 A1* | 4/2023 | Wei .................. H04W 72/0446 370/329 |

OTHER PUBLICATIONS

Wei Ke-jin, et al., "Analysis of Faraday Mirror in Auto-Compensating Quantum Key Distribution", Chinese Physics Letters, vol. 32, Issue (08), pp. 080303-1-080303-2, Sep. 2015, 7 pages.

Alexandra C. Johansson, et al., "Optical frequency comb Faraday rotation spectroscopy", Applied Physics B 124, Article No. 79, Apr. 2018, pp. 1-4, 10 pages.

Wang Weilong, et al., Effect of imperfect Faraday mirrors on security of a Faraday-Michelson quantum crypography system, J. Phys. A: Math. Theor, Quantum Physics, arXiv: 1310.7668, pp. 1-12, Oct. 2013, 15 pages.

PCT International Application No. PCT/KR2020/008683, International Search Report dated Mar. 9, 2021, 4 pages.

* cited by examiner

FIG. 22
Faraday Rotator, First Pass
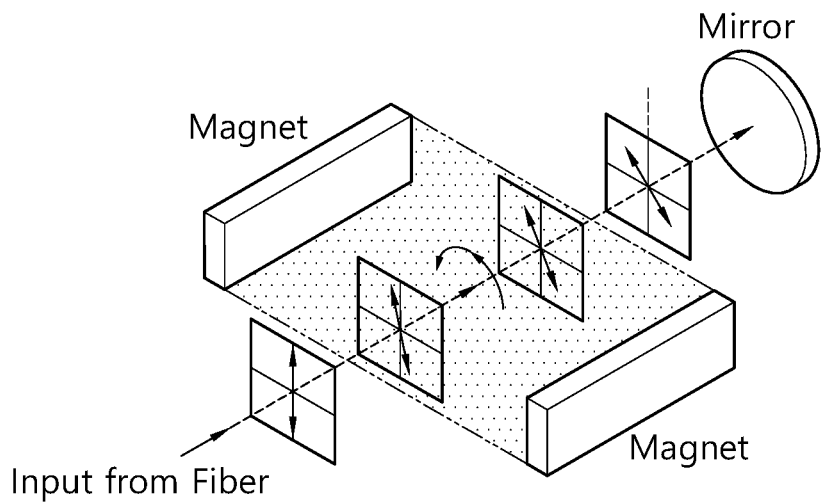
Faraday Rotator, Second Pass
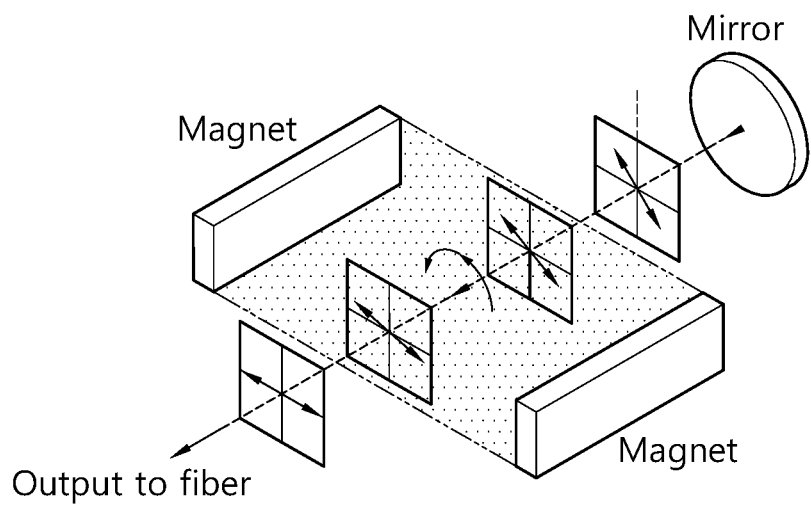

FIG. 30
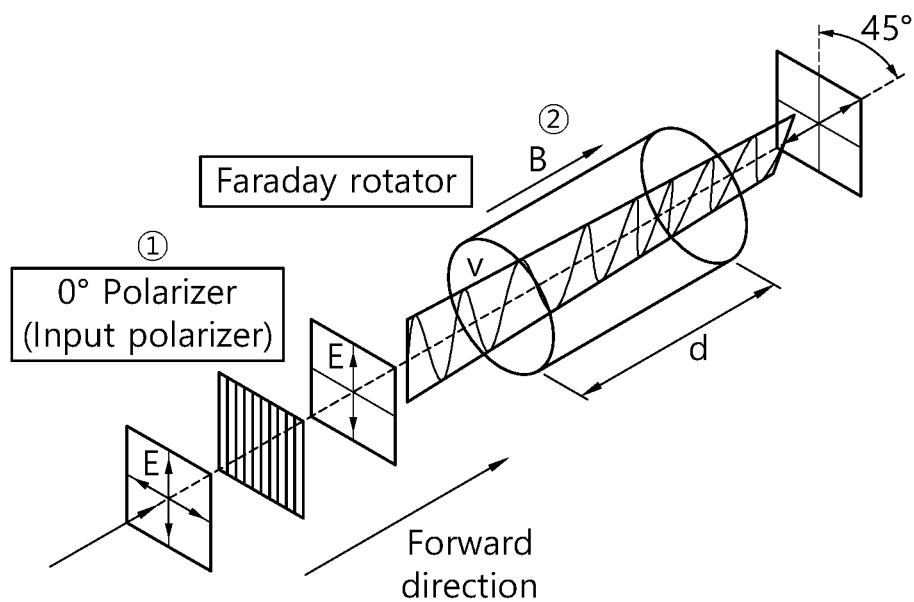
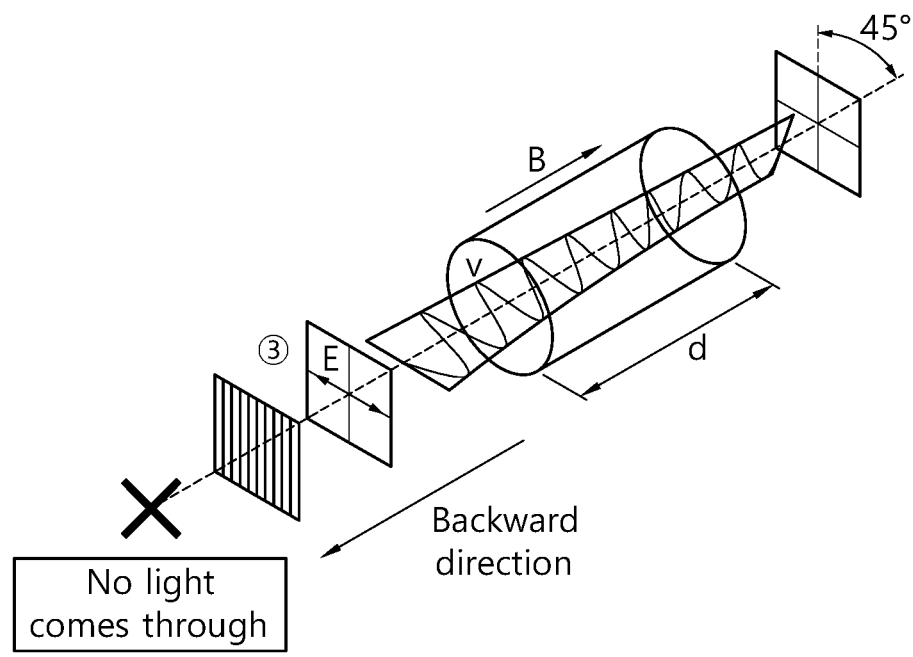

METHOD AND DEVICE FOR CORRECTING POLARIZATION DISTORTION IN PLUG AND PLAY QUANTUM KEY DISTRIBUTION SYSTEM

CROSS-REFERENCE TO RELATED APPLICATIONS

This application is the National Stage filing under 35 U.S.C. 371 of International Application No. PCT/KR2020/008683, filed on Jul. 2, 2020, the contents of which are all incorporated by reference herein in their entirety.

BACKGROUND OF THE DISCLOSURE

Field of the disclosure

This specification relates to quantum communication systems.

Related Art

Due to the advent of quantum computers, it has become possible to hack existing cryptographic systems based on mathematical complexity (e.g., RSA, AES, etc.). To prevent hacking, quantum cryptographic communication is proposed.

Meanwhile, the present specification intends to provide a method for correcting polarization distortion of a Faraday rotating mirror in a plug-and-play quantum key distribution system and an apparatus using the same.

SUMMARY

According to one embodiment of the present specification, it provides a method and apparatus for correcting an error performed by an apparatus in a quantum communication system, where an error is measured based on the test pulse and key information is distributed between the device and other devices based on error correction using the improved Faraday rotation mirror of the device.

According to the present specification, an imperfect Faraday rotation mirror can be calibrated to operate as an ideal Faraday rotation mirror, this prevents PFM attacks by removing security loopholes caused by the incompleteness of Faraday rotating mirrors and the PnP quantum key distribution system can guarantee the ideal security of the BB84 protocol.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

BRIEF DESCRIPTION OF THE DRAWINGS

FIG. 22 schematically illustrates an example of polarization rotation of light by a Faraday rotation mirror.

FIG. 30 shows an example of the operation of the error detection circuit for an ideal Faraday rotating mirror, FIG. 31 schematically shows the error components detected for an imperfect Faraday rotation mirror.

DESCRIPTION OF EXEMPLARY EMBODIMENTS

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband communication, massive MTC, URLLC (Ultra-Reliable and Low Latency Communication) is being discussed, in this specification, for convenience, the corresponding technology is referred to as new RAT or NR.

Figure 1:
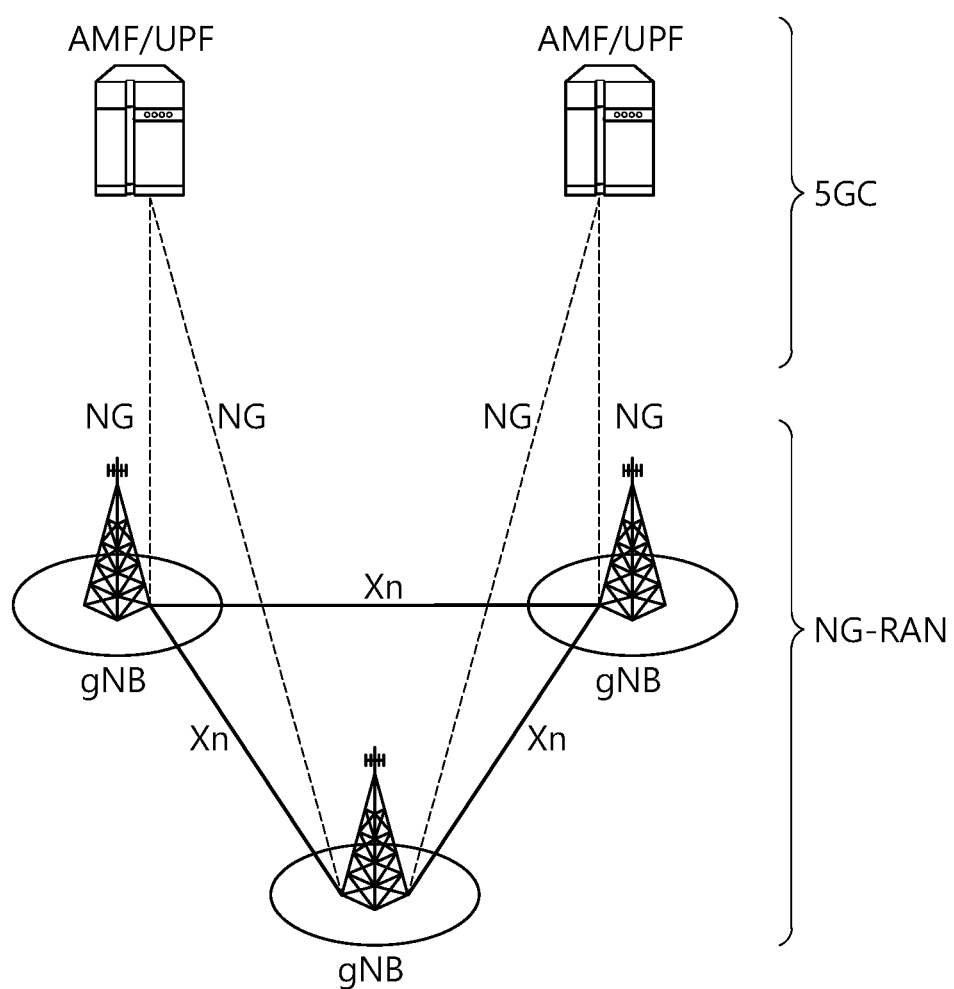
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
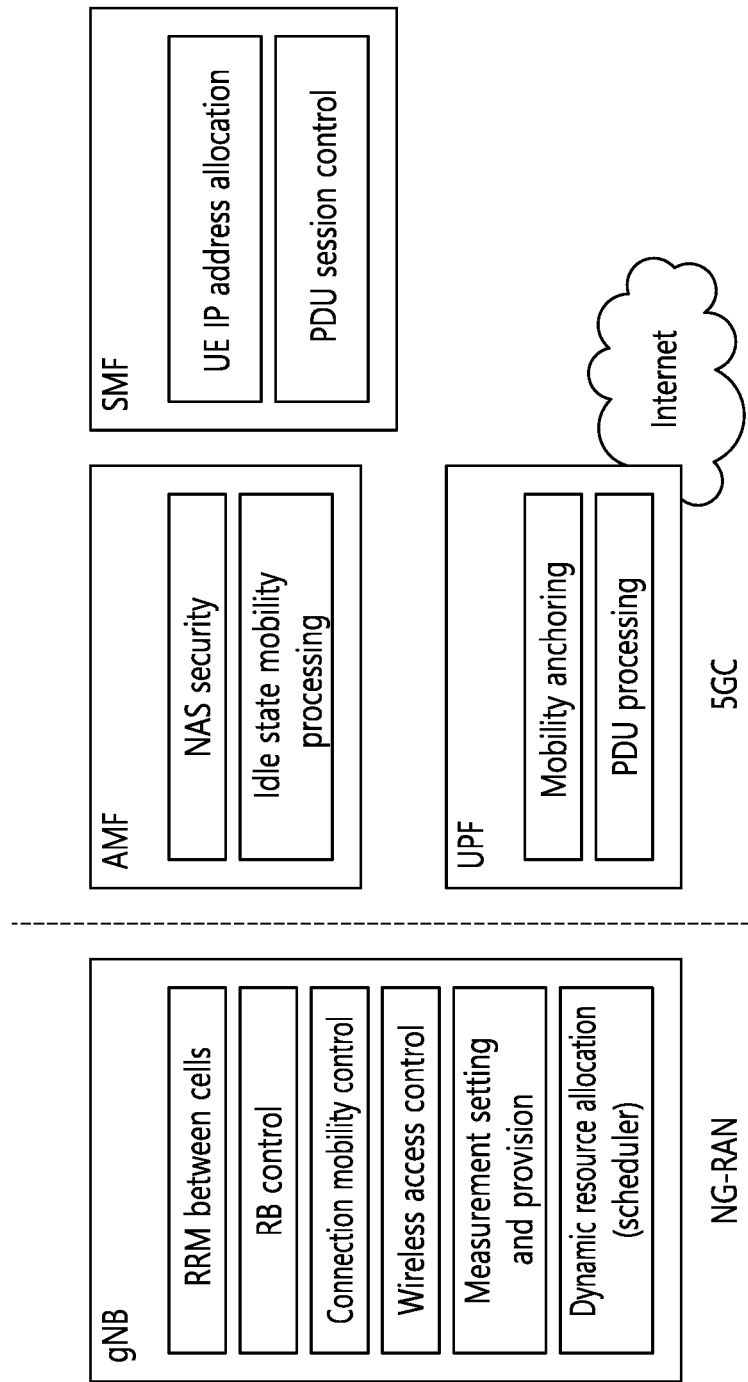
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
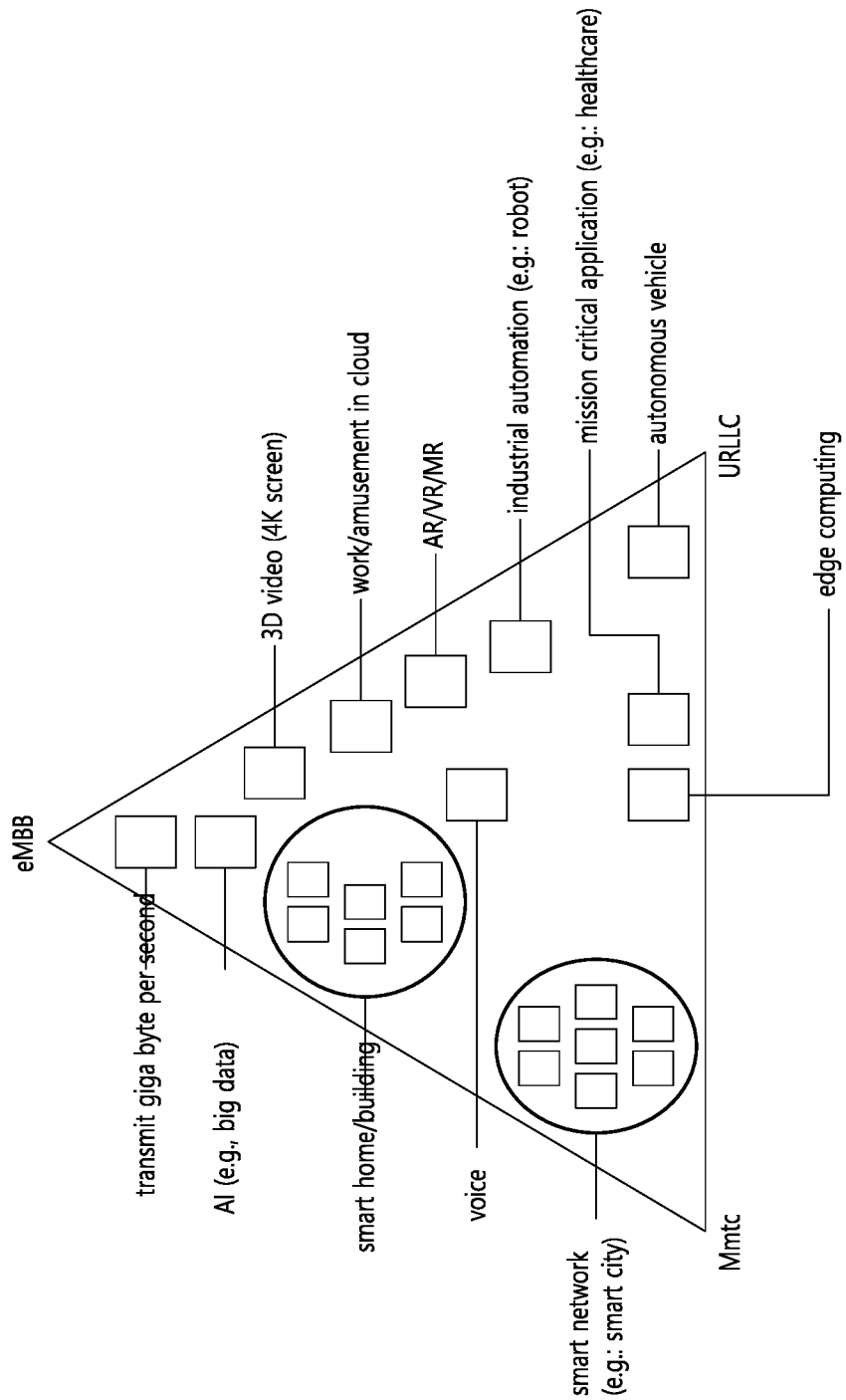
FIG. 3 shows an example of a 5G usage scenario to which the technical features of the present specification can be applied.

FIG. 3 shows examples of 5G usage scenarios to which the technical features of the present specification can be applied. The 5G usage scenarios shown in FIG. 3 are only exemplary, and the technical features of the present specification can be applied to other 5G usage scenarios which are not shown in FIG. 3.

Referring to FIG. 3, the three main requirements areas of 5G include (1) enhanced mobile broadband (eMBB)

domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/$km^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present specification will be described.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 1

| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 4:
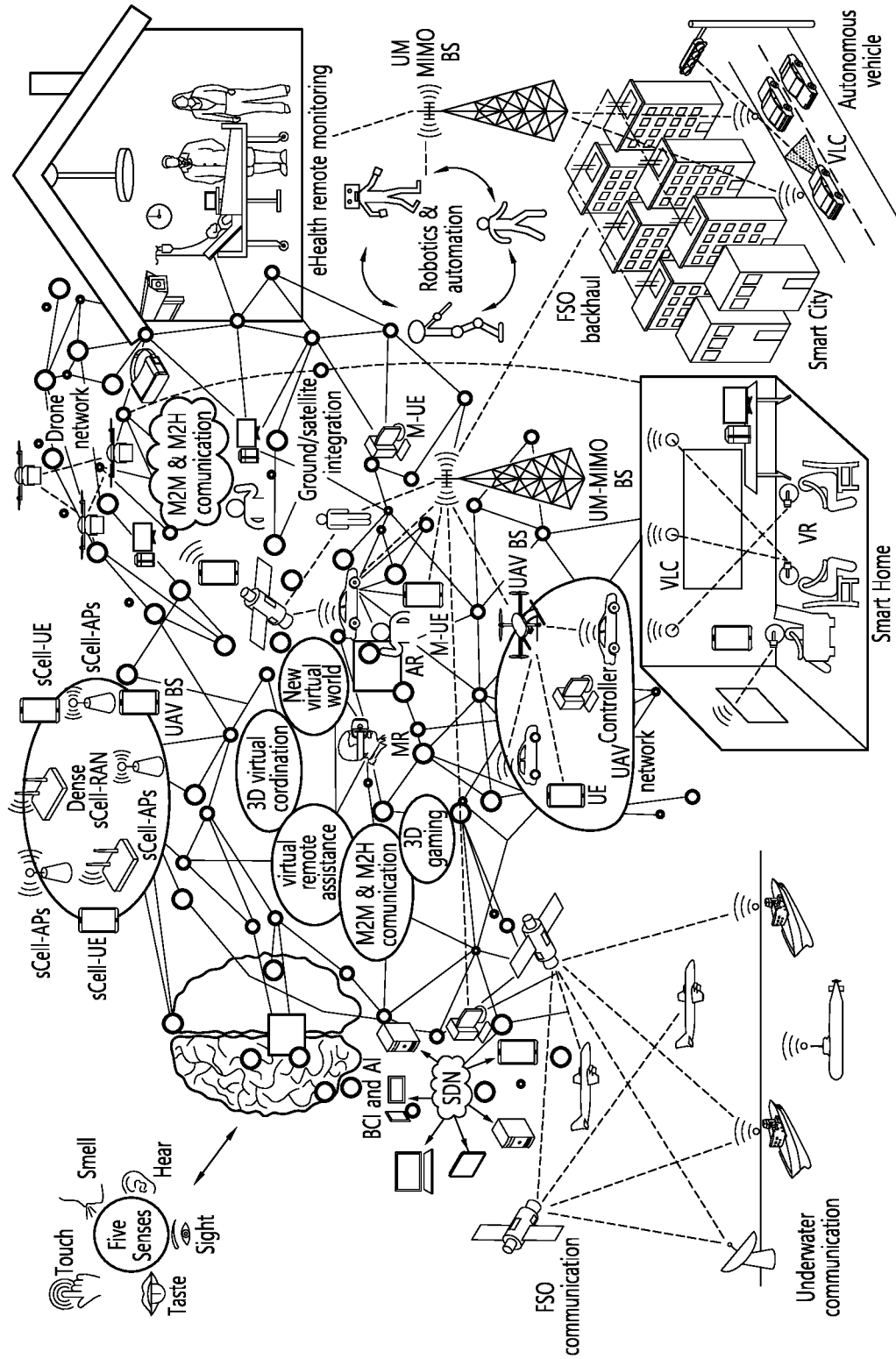
FIG. 4 is a diagram showing an example of a communication structure that can be provided in a 6G system.

FIG. 4 is a diagram showing an example of a communication structure that can be provided in a 6G system.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5GB network in order to ensure flexibility, reconfigurability and programmability.

<Core Implementation Technology of 6G System>

Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 5:
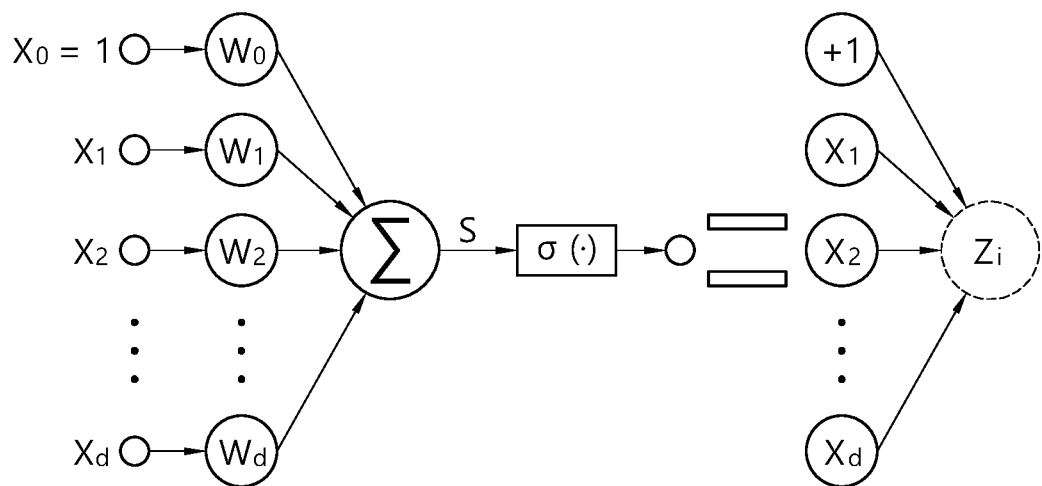
FIG. 5 schematically illustrates an example of a perceptron structure.

FIG. 5 schematically illustrates an example of a perceptron structure.

Referring to FIG. 5, if the input vector x=(x1, x2, . . . , xd) is input, each component is multiplied by the weight (W1, W2, . . . , Wd), after summing up all the results, applying the activation function $\sigma(\cdot)$, the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
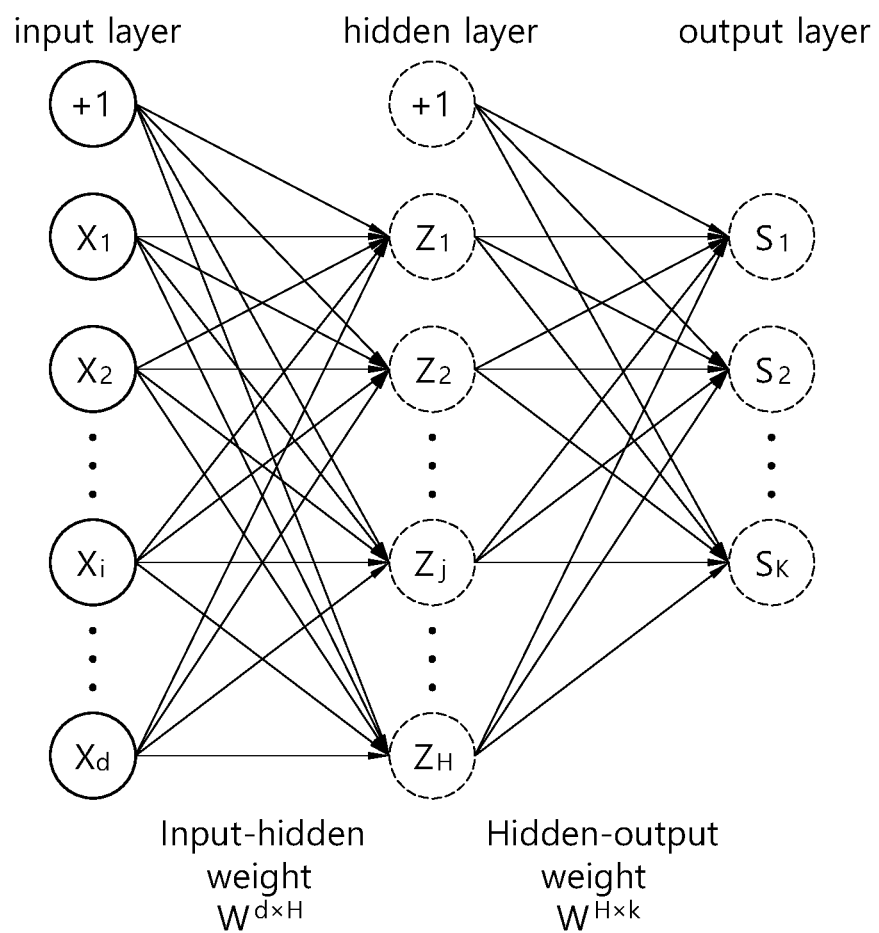
FIG. 6 schematically illustrates an example of a multi-layer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers.

In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
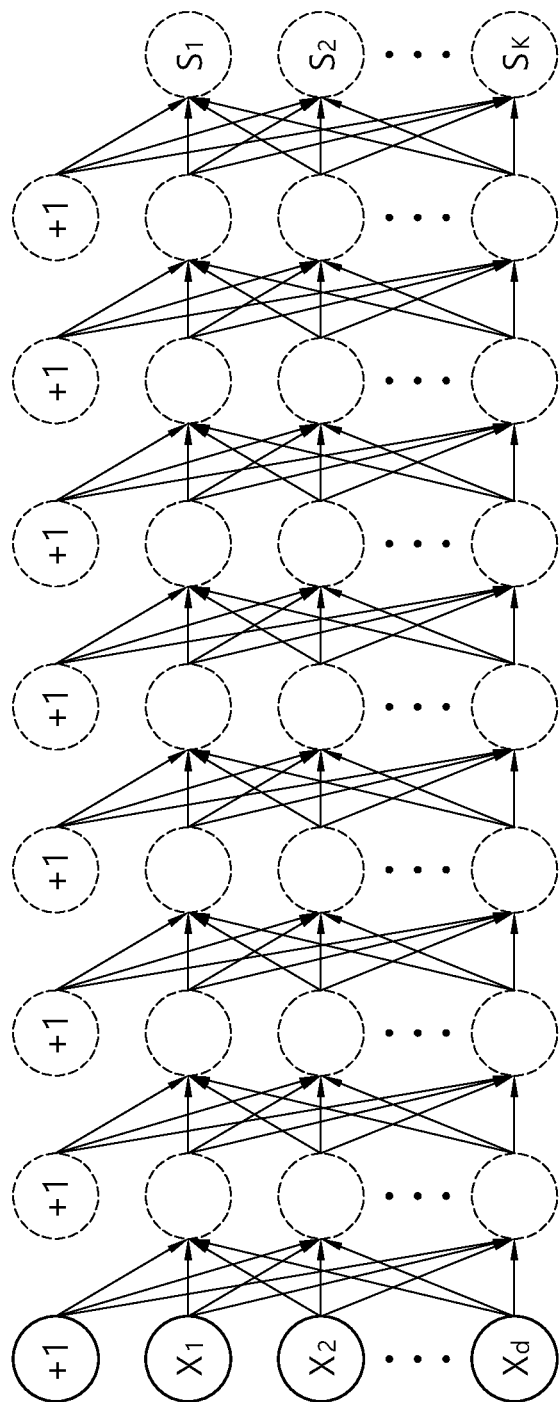
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
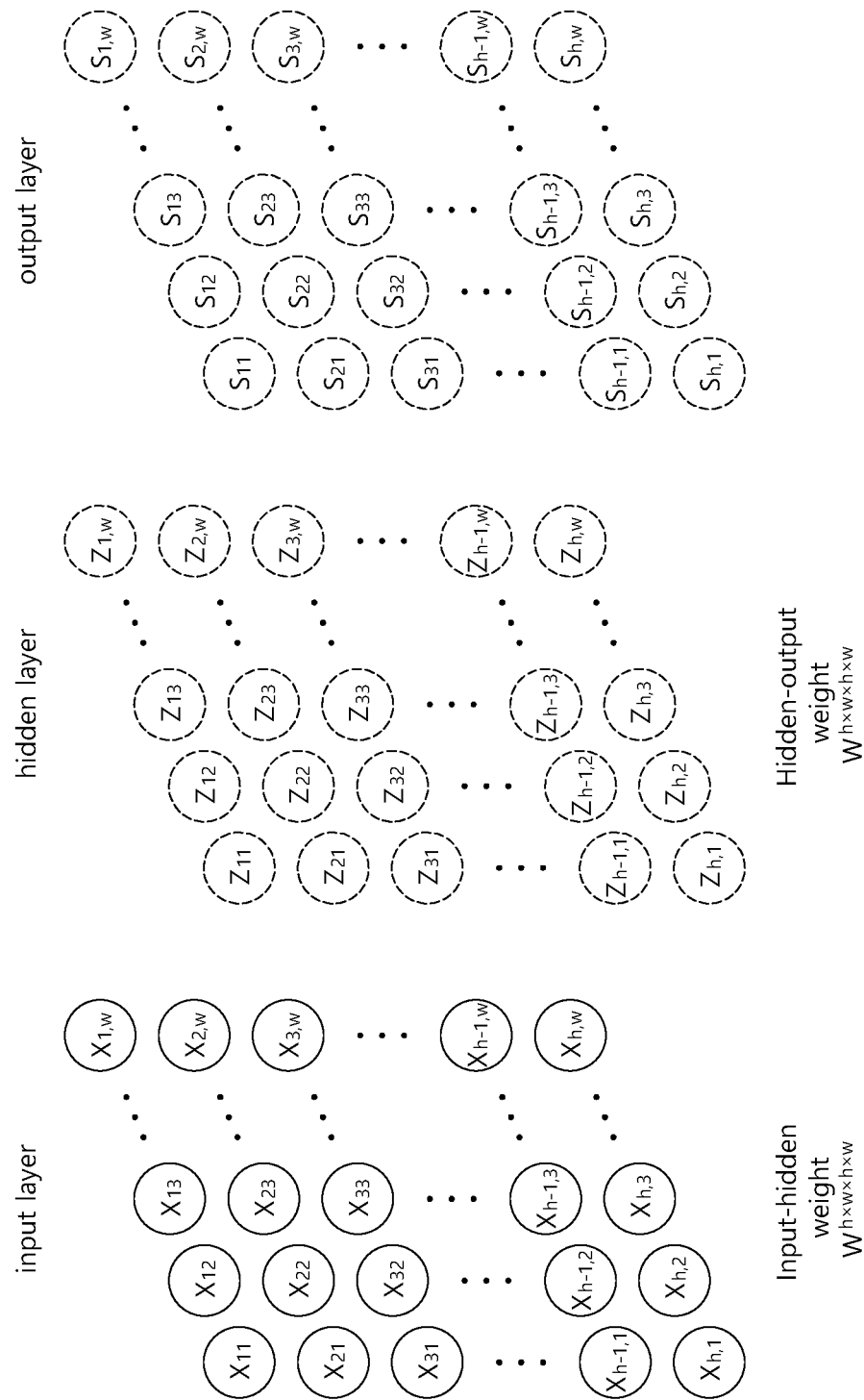
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of h×w weights must be considered. Since there are h×w nodes in the input layer, a total of h2w2 weights are required between two adjacent layers.

Figure 9:
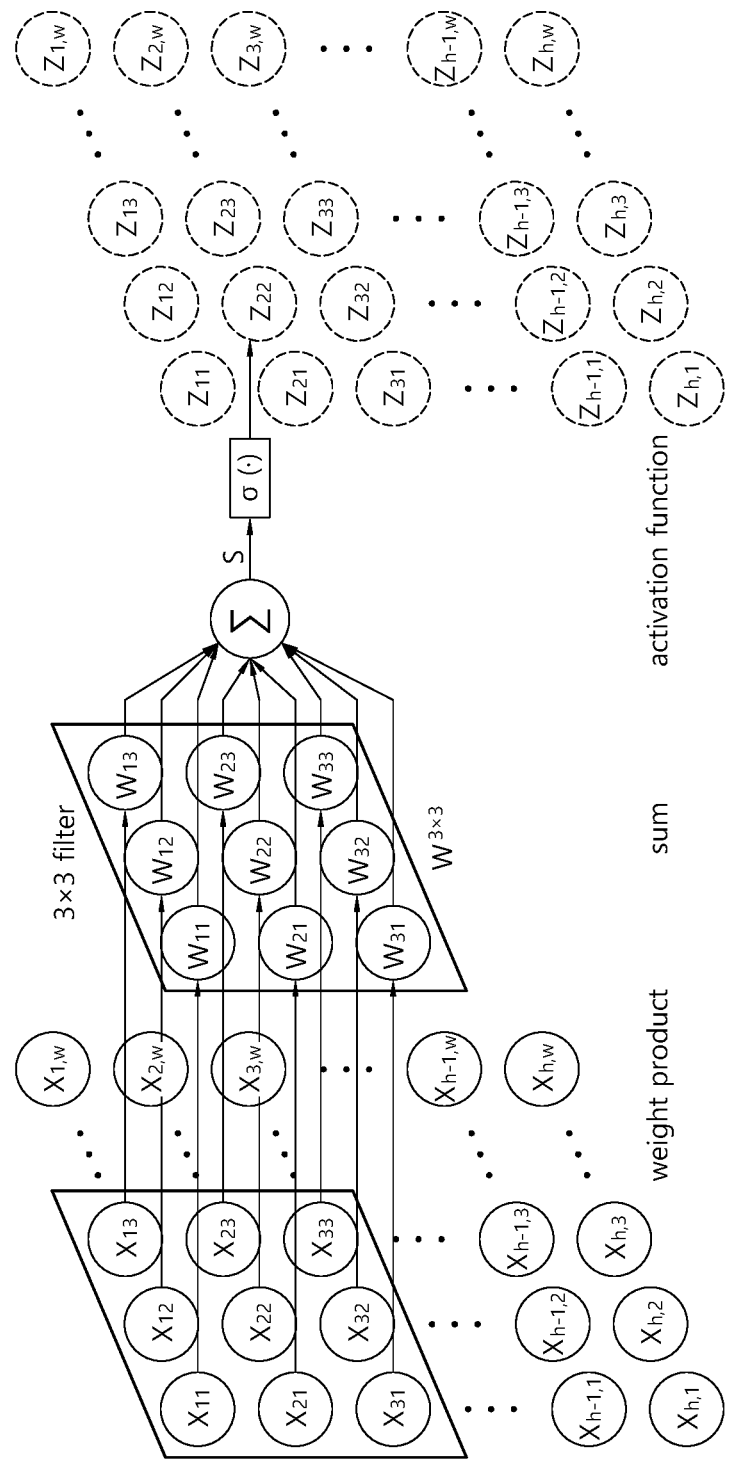
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
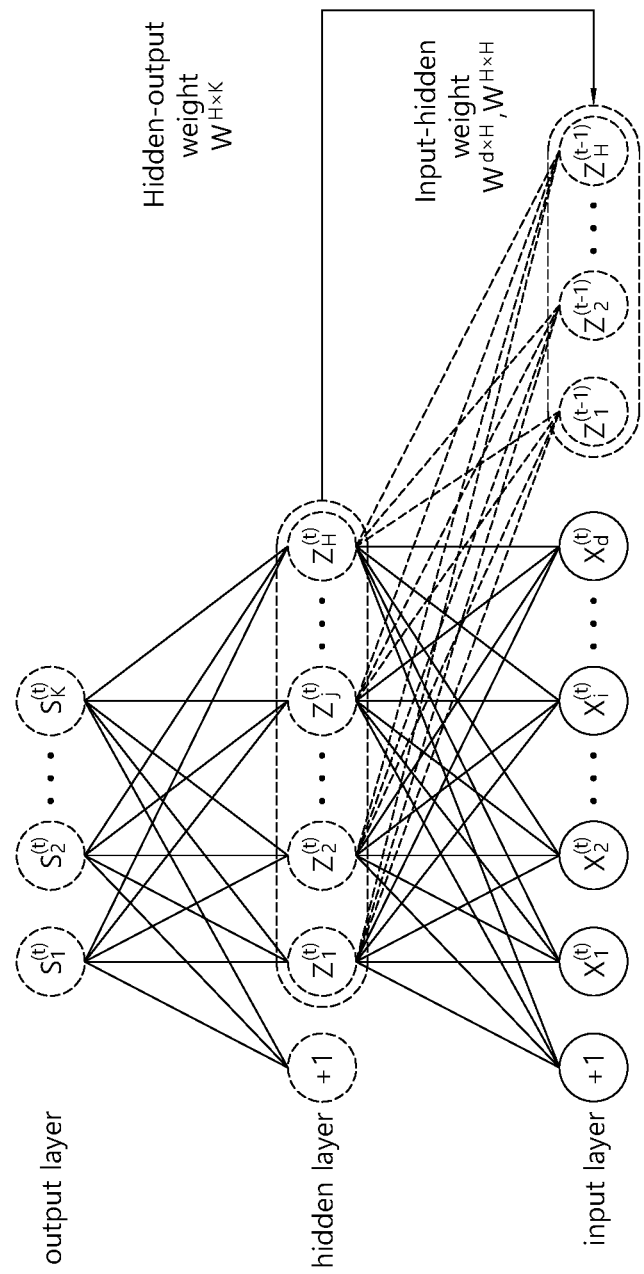
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element (x1(t), x2(t), . . . , xd(t)) of any gaze t on the data sequence to the fully connected neural network, by entering together the hidden vector (z1(t−1), z2(t−1), . . . , zH(t−1)) of the immediately preceding time point t-1. The reason why the hidden vector is transmitted to the next time point in this way is that information in the input vector at previous time points is regarded as being accumulated in the hidden vector of the current time point.

Figure 11:
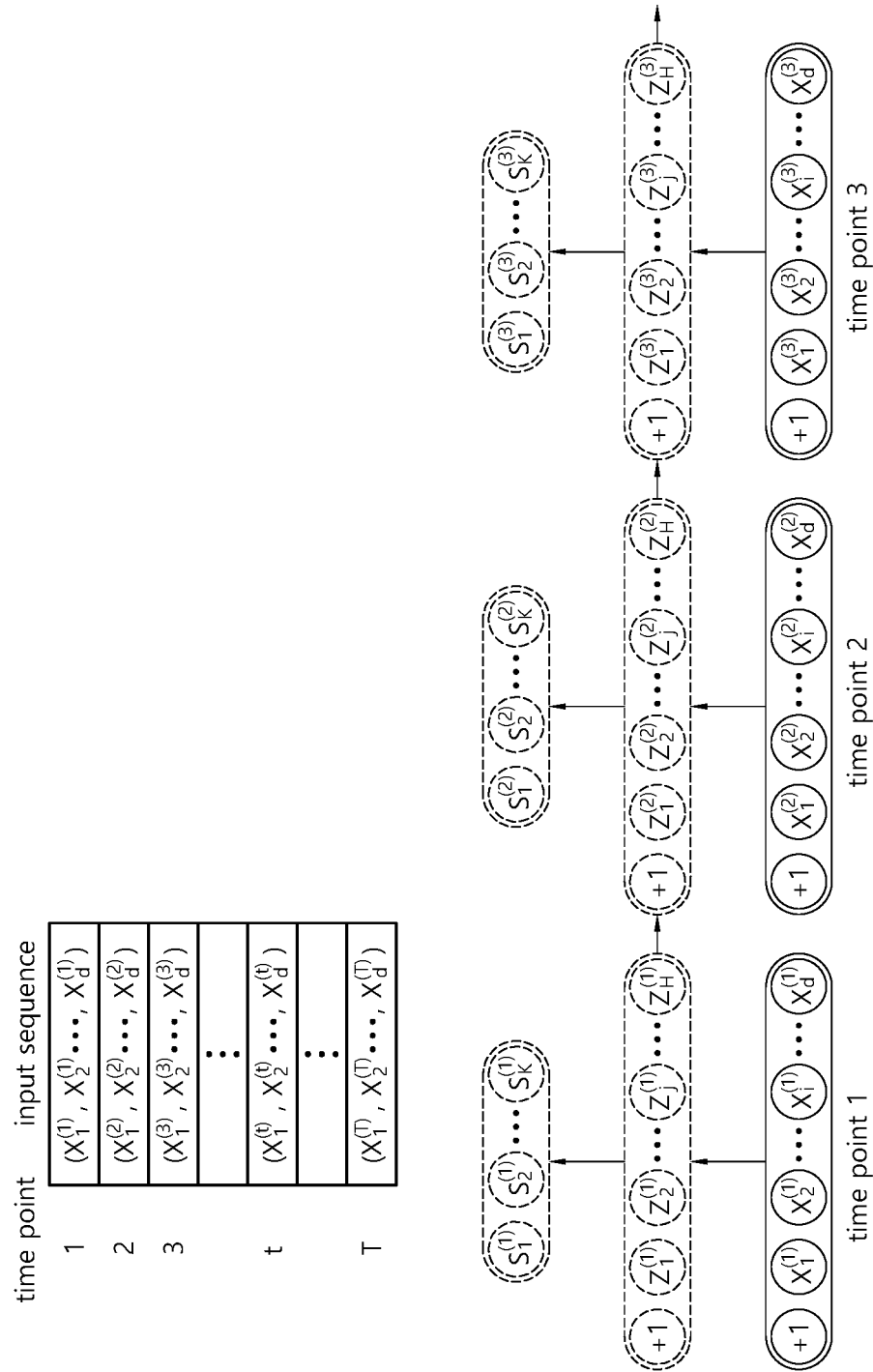
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors (z1(1),z2(1), . . . , zH(1)) when the input vectors (x1(t), x2(t), . . . , xd(t)) at time point 1 are input to the recurrent neural network is input together with the input vector (x1(2), x2(2), . . . , xd(2)) of time point 2, the vector (z1(2),z2(2), . . . , zH(2)) of the hidden layer is determined through the weighted sum and activation function. This process is repeatedly performed until time point 2, point 3, , , , point T.

Meanwhile, when a plurality of hidden layers are arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz (Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
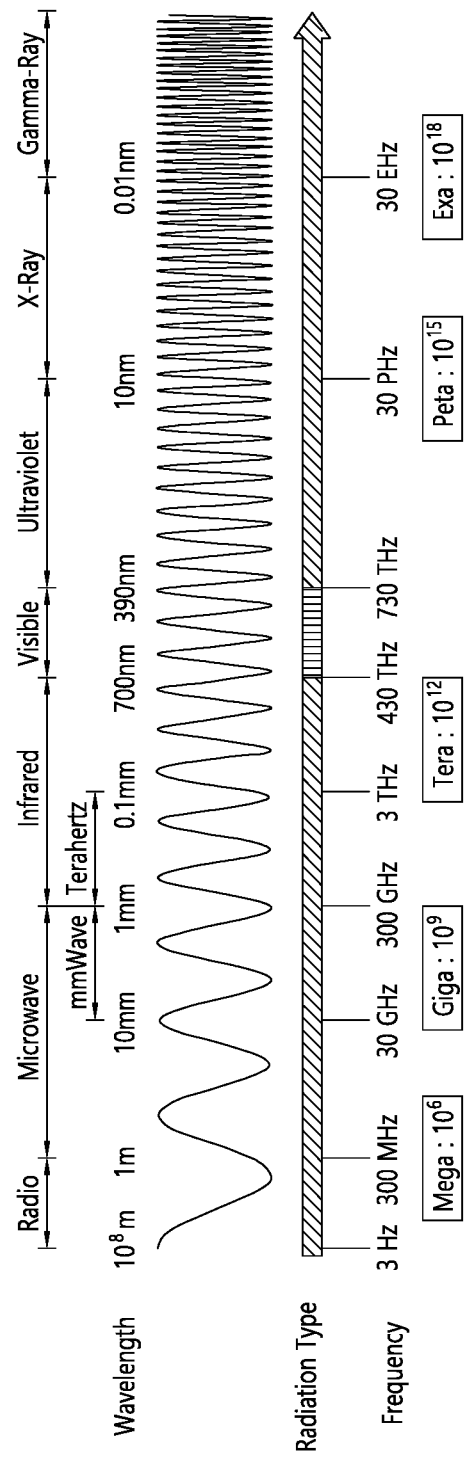
FIG. 12 shows an example of an electromagnetic spectrum.

FIG. 12 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

<General Terahertz (THz) Wireless Communication>

THz wireless communication uses a THz wave having a frequency of approximately 0.1 to 10 THz (1 THz=$10^{12}$ Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
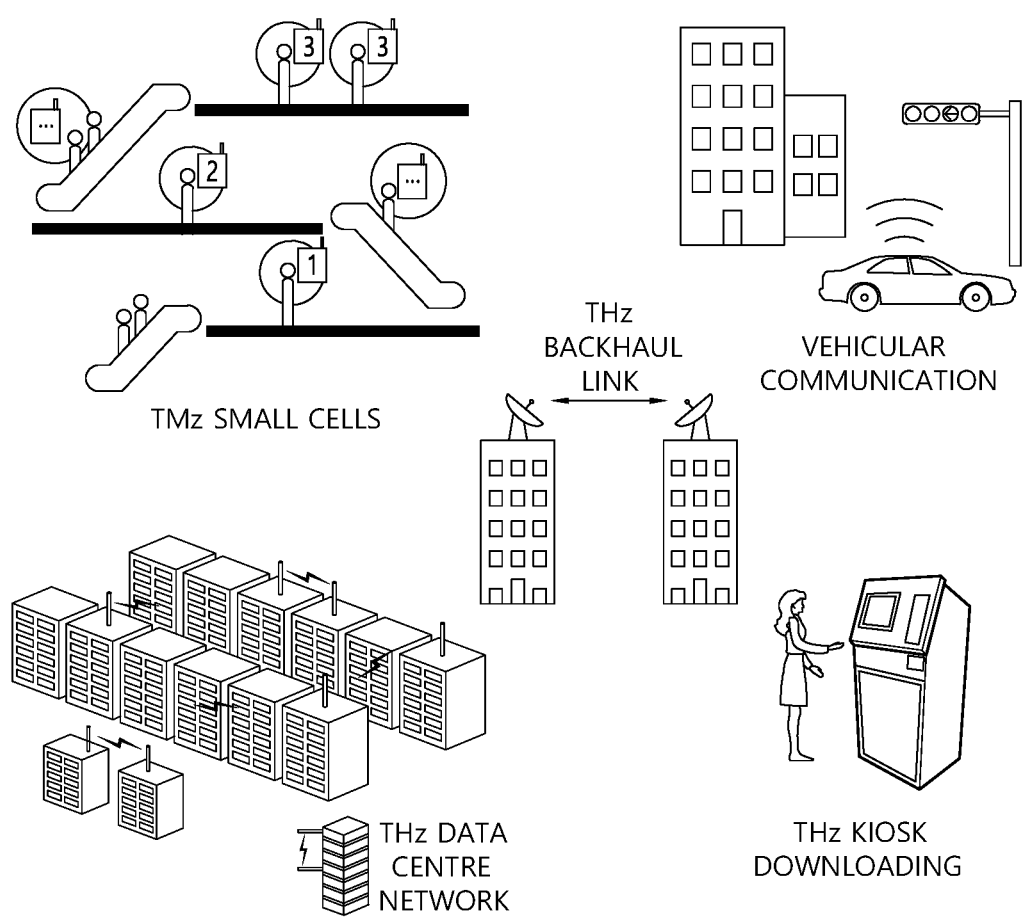
FIG. 13 is a diagram showing an example of a THz communication application.

FIG. 13 is a diagram showing an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |

TABLE 2-continued

| | |
|---|---|
| Free space loss | High |
| Coverage | Low |
| Radio Measurements | 300 GHz indoor |
| Device size | Few micrometers |

THz wireless communication can be classified based on the method for generating and receiving THz. The THz generation method can be classified as an optical device or an electronic device based technology.

Figure 14:
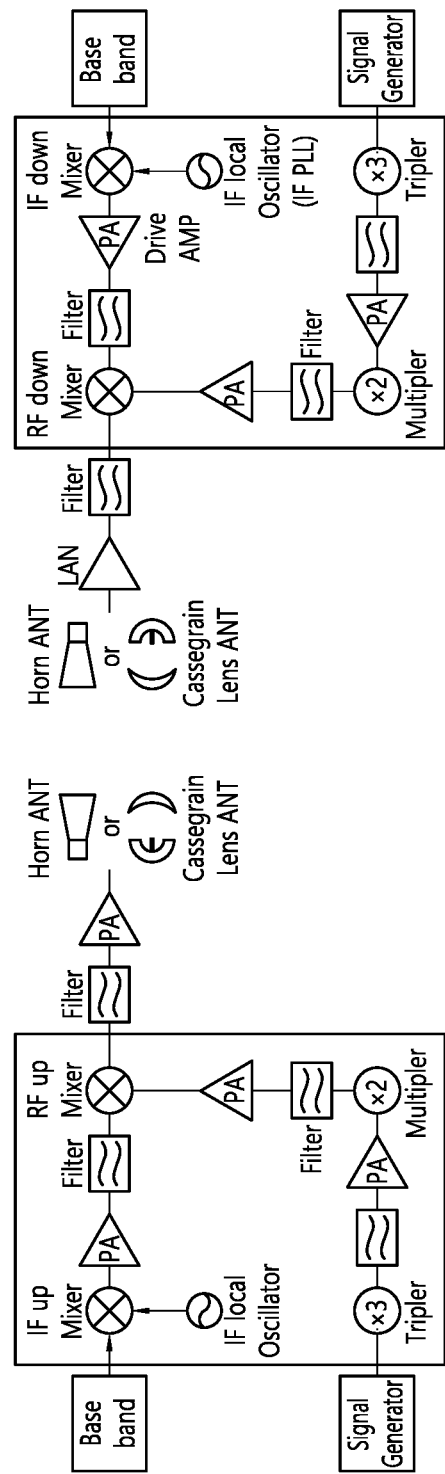
FIG. 14 is a diagram showing an example of an electronic element-based THz wireless communication transceiver.

FIG. 14 is a diagram showing an example of an electronic element-based THz wireless communication transceiver.

the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop.

Figure 15:
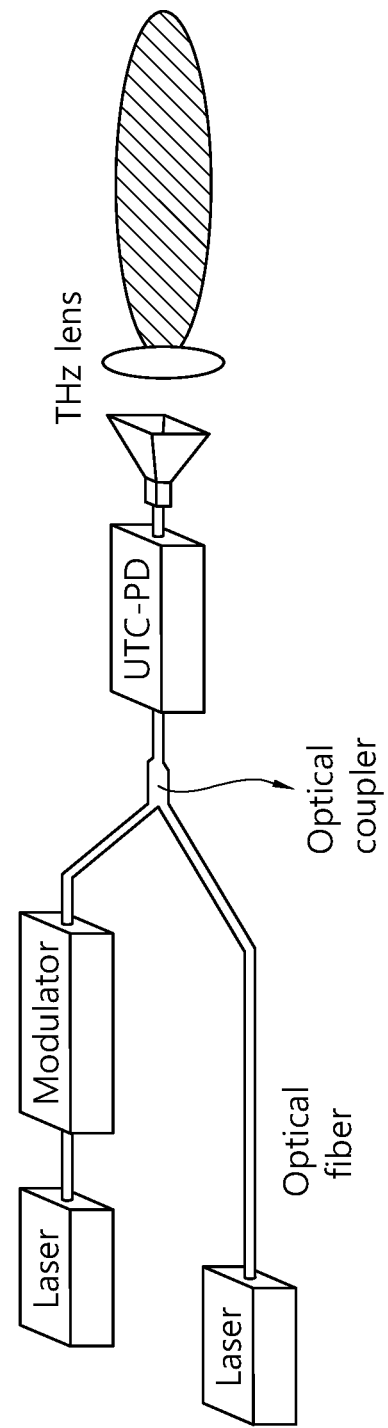
FIG. 15 is a diagram illustrating an example of a method for generating a THz signal based on an optical device.
Figure 16:
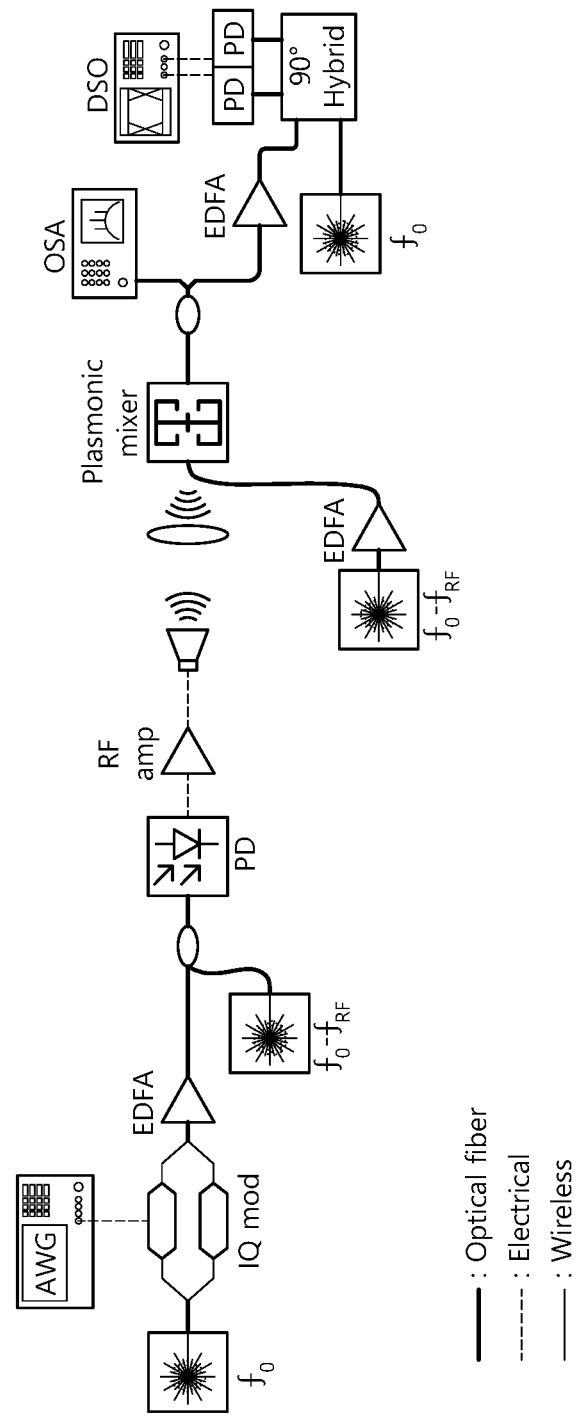
FIG. 16 is a diagram illustrating an example of a THz wireless communication transceiver based on an optical device.

FIG. 15 is a diagram illustrating an example of a method for generating a THz signal based on an optical device, and FIG. 16 is a diagram illustrating an example of a THz wireless communication transceiver based on an optical device.

Figure 19:
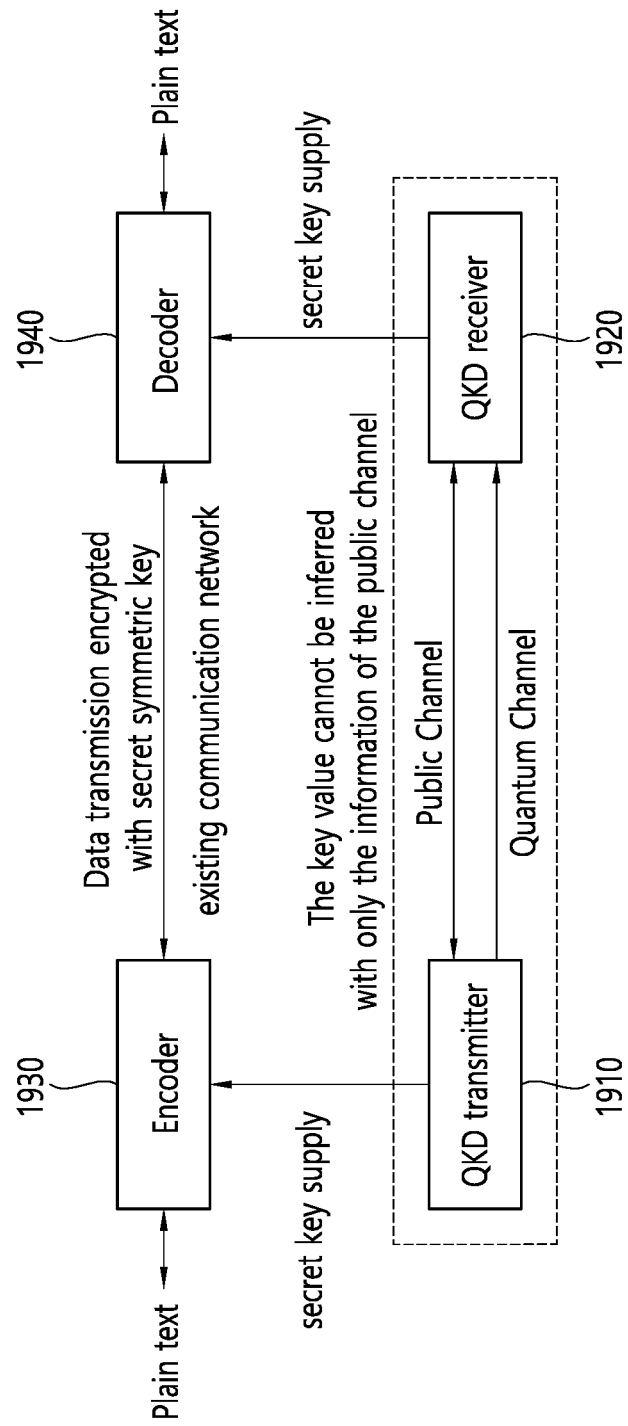
FIG. 19 schematically illustrates an example of quantum cryptographic communication.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a unitravelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 17:
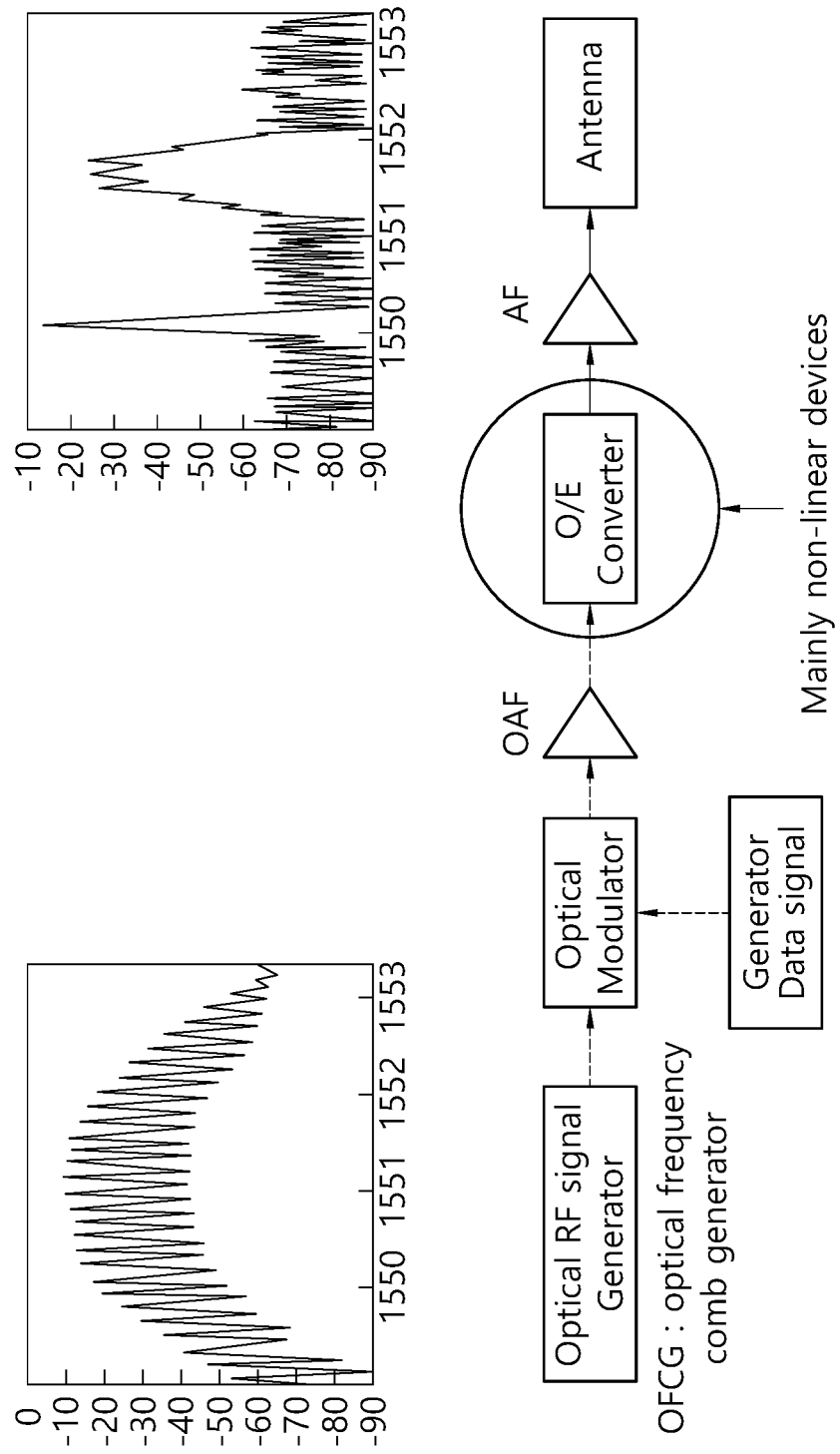
FIG. 17 illustrates a structure of a transmitter based on a photoinc source.
Figure 18:
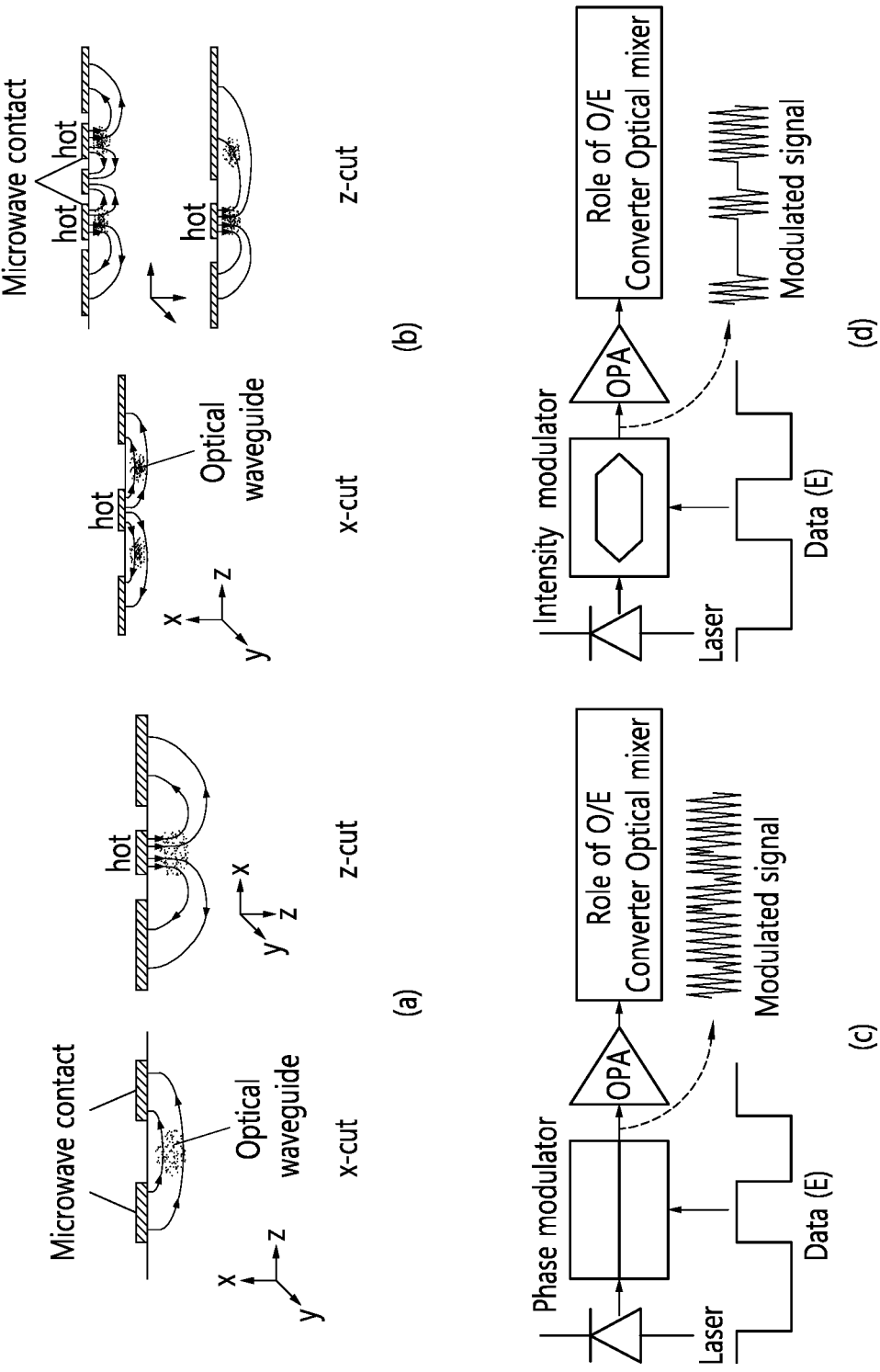
FIG. 18 illustrates a structure of an optical modulator.

The structure of the photoelectric converter (or photoelectric converter) will be described with reference to FIGS. 17 and 18. FIG. 17 illustrates a structure of a transmitter based on a photoinc source, and FIG. 18 illustrates a structure of an optical modulator.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

<Quantum Cryptographic Communication>

FIG. 19 schematically illustrates an example of quantum cryptographic communication.

According to FIG. 19, a quantum key distribution (QKD) transmitter 1910 may perform communication by being connected to a QKD receiver 1920 through a public channel and a quantum channel.

At this time, the QKD transmitter 1910 may supply the secret key to the encryptor 1930, and the QKD receiver 1920 may also supply the secret key to the decryptor 1940. Here, plain text may be input/output to the encryptor 1930, the encryptor 1930 may transmit encrypted data with a secret symmetric key to the decryptor 1940 (through an existing communication network). In addition, plain text may be input/output to the decoder 1940.

A more detailed description of quantum cryptographic communication is as follows.

In a quantum cryptographic communication system, a signal is carried using a single photon, which is the smallest unit of light, unlike conventional communication methods that communicate by wavelength or amplitude. While most conventional cryptosystems are guaranteed stability by the complexity of mathematical algorithms, since quantum cryptographic communication is based on the stability of quantum's unique properties, its stability is guaranteed unless the physical laws of quantum mechanics are broken.

The most representative quantum key distribution protocol is the BB84 protocol proposed by C. H. Bennett and G. Brassard in 1984. In the BB84 protocol, information is carried on states such as polarization and phase of photons, in theory, it is possible to share the sift key absolutely safely by using the characteristics of both. The figure shows an example of the BB84 protocol that generates a secret key by loading information on the polarization state between Alice on the sending side and Bob on the receiving side, the overall flow of the BB84 protocol for this is as follows.

(1). Alice randomly generates bits.
(2). Randomly select a transmission polarizer to determine which polarization to load bit information on.
(3). A polarization signal corresponding to a randomly generated bit in 1 and a randomly selected polarizer in 2 is generated and transmitted through a quantum channel.
(4). Bob randomly selects a measurement polarizer to measure the polarization signal transmitted by Alice.
(5). The polarization signal transmitted by Alice with the selected polarizer is measured and stored.
(6). Alice and Bob share which polarizer they used through the classical channel.
(7). The secret key is obtained by keeping only bits with the same polarizer and removing bits with different polarizers.

phase difference between the two components, and the phase difference between the two components means that the polarization is distorted.

Figure 20:
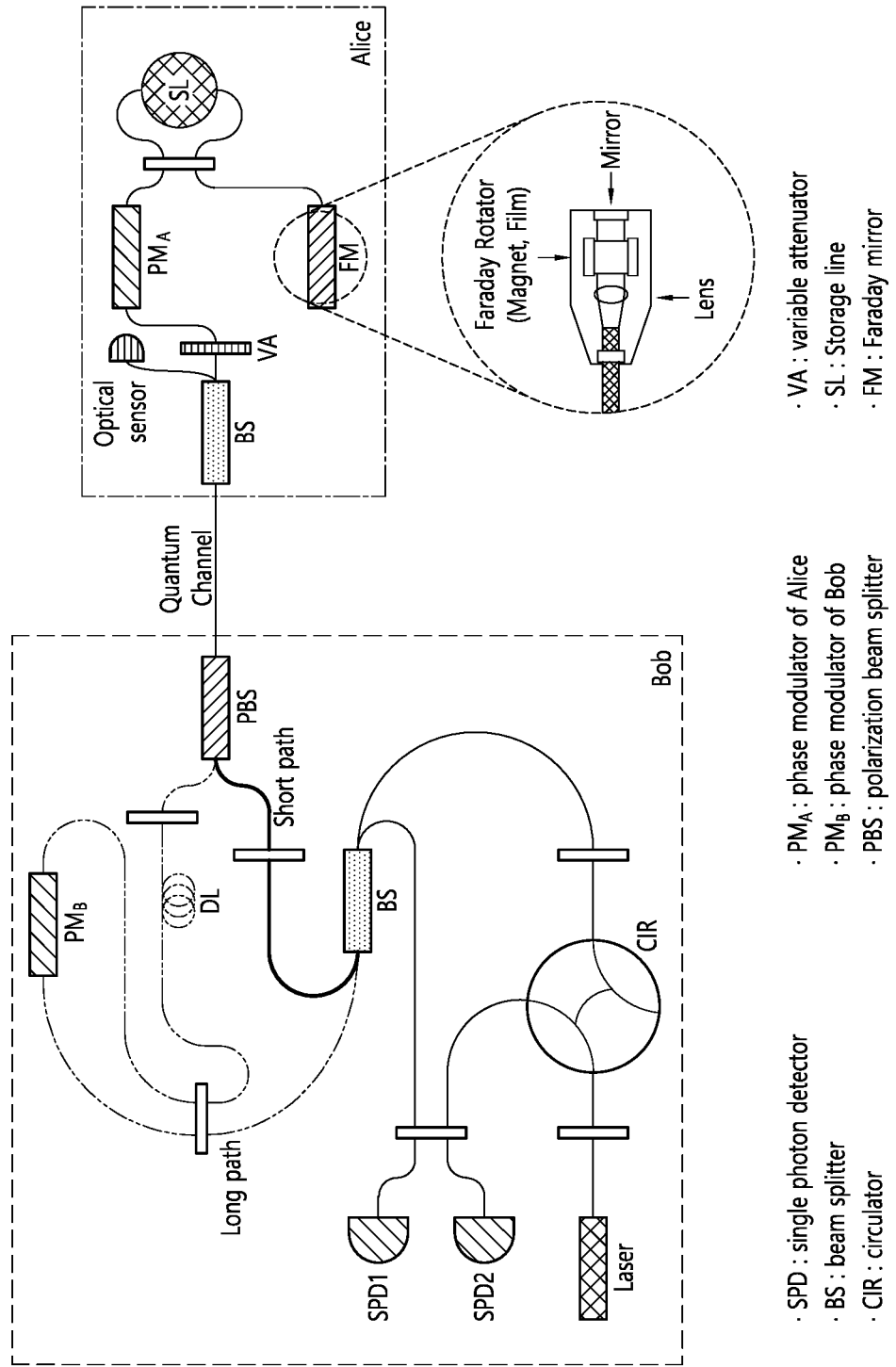
FIG. 20 schematically illustrates the basic structure of a plug-and-play quantum key distribution system.

FIG. 20 schematically illustrates the basic structure of a plug-and-play quantum key distribution system.

The Plug & Play (PnP) quantum key distribution method has recently been widely used due to the advantage of automatically compensating for polarization distortion due to birefringence during transmission. FIG. 20 shows the basic structure of a PnP quantum key distribution system. A general quantum key distribution system is based on a one-way method in which the sender (Alice) transmits information in a quantum state, and the receiver (Bob) measures it to generate a secret key, the PnP quantum key distribution system adopts a two-way method when Bob generates and transmits a reference pulse, Alice receives it, carries bit information on the phase state, and sends it back to Bob. The overall flow of the BB84 protocol implemented through the PnP quantum key distribution system is as follows.

(1). Bob generates reference pulses in the following order and transmits them to Alice.
  1) Pulses are generated using a laser.
  2) The generated pulse is split into two pulses a and b using a beam splitter (BS).
  3) Among the divided pulses, the polarization of pulse a is rotated by 90° by the polarization controller included here while passing through a short path, a time delay is applied to pulse b as it passes through a long path.
  4) Since pulses a and b have polarizations orthogonal to each other, they are transmitted to the quantum channel through the same port of the polarization beam splitter (PBS).

(2). Alice transmits bit information to Bob in the following order on the phase of the reference pulse sent by Bob.
  1) The received pulses a and b are split by a beam splitter, and some of them are incident on an optical sensor.
  2) The optical sensor analyzes the timing and strength of the received pulse to generate a trigger signal for synchronizing the clocks of Alice and Bob, this sets the variable attenuator (VA) to attenuate the pulse to the single-photon level.

TABLE 3

| Bits created by Alice | 0 | 1 | 1 | 0 | 1 | 0 | 0 | 1 |
|---|---|---|---|---|---|---|---|---|
| Alice's choice of transmission polarizer | + | + | x | + | x | x | x | + |
| Polarized signal transmitted by Alice | ↑ | → | ↘ | ↑ | ↘ | ↗ | ↗ | → |
| Bob's choice of measurement polarizer | + | x | x | x | + | x | + | x |
| Polarization signal measured by Bob | ↑ | ↗ | ↘ | ↗ | → | ↗ | → | → |
| Verification of whether transmission polarizer and measurement polarizer match | Data exchange over classical channels | | | | | | | |
| Finally generated secret key | 0 | | 1 | | 0 | | | 1 |

Theoretically, this BB84 protocol guarantees absolute security, but there are flaws in actual hardware implementation, a typical example is polarization distortion due to birefringence of an optical fiber. Birefringence refers to a phenomenon in which the polarization component perpendicular to the optical axis of the medium and the polarization component horizontal to the optical axis of the medium experience different time delays when light passes through a non-isotropic medium. These different time delays cause a 3) Based on the synchronized clock, the variable attenuator attenuates the second pulse, pulse b, to the single-photon level, a phase modulator (PM) also acts on the attenuated pulse b, among 0, π/2, π, and 3π/2, Alice applies a phase shift corresponding to the transmission base and bit information selected in the BB84 protocol.
  4) Pulses a and b are reflected off the Faraday rotating mirror and transmitted through the quantum channel to Bob with their polarization rotated by 90°.

(3). Bob measures the stored bit information by receiving pulses a and b transmitted by Alice in the following order.
  1) Since the polarization of pulses a and b has been rotated by 90° by Alice's Faraday rotating mirror, they pass through Bob's polarization splitter on the opposite path (pulse a is the long path, pulse b is the short path).
  2) Pulse a is subjected to a phase shift of 0 or π/2, corresponding to Bob's chosen measurement basis, by the long path phase modulator, pulse b has the same polarization as pulse a as the polarization is rotated by 90° by the short path polarization controller.
  3) Since pulses a and b travel the same length path as a result, they meet at the same time in Bob's beam splitter and cause interference.
  4) If Bob's metric is identical to Alice's transmission basis, superimposed pulses are deterministically detected by one of single photon detectors (SPD) 1 and 2, a case of mismatch is probabilistically detected by one of the single photon detectors 1 and 2.

Figure 21:
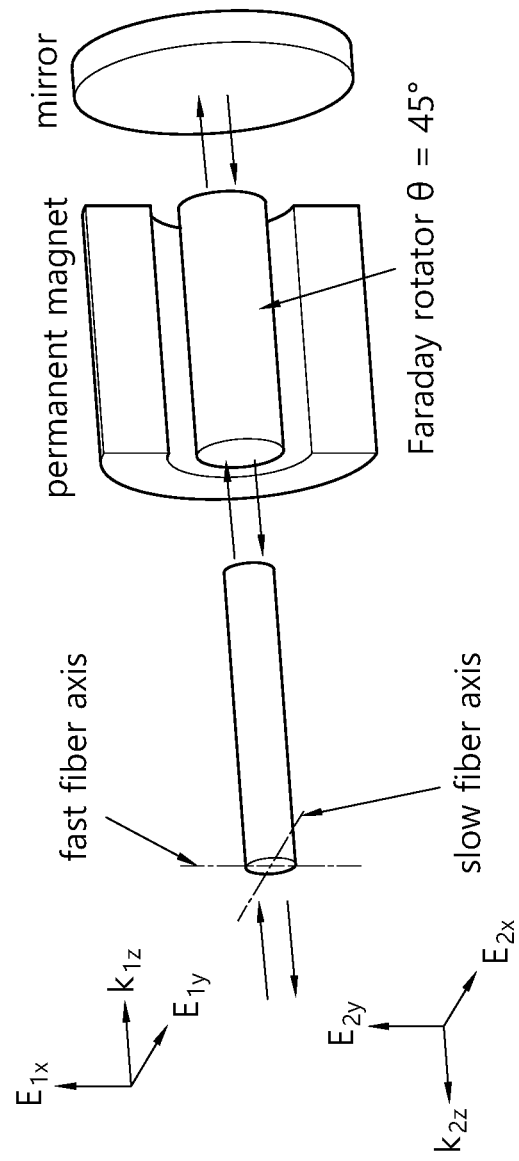
FIG. 21 schematically illustrates an example of a Faraday rotation mirror.

FIG. 21 schematically illustrates an example of a Faraday rotation mirror.

The effect of birefringence generated in the transmission path from Bob to Alice is automatically compensated in the path from Alice to Bob, in this case, a Faraday rotator mirror plays a key role. As shown in FIG. 21, the Faraday rotation mirror is composed of a Faraday rotator and a general mirror, the Faraday rotor is based on Faraday's law, which states that light rotates in a certain direction when it passes through a magnetic field. The rotation angle 13 [radian] of polarized light by the Faraday rotator is calculated by the formula below.

$$\beta = VBd \quad (1)$$

Here, V is the Verdet constant [radian/(T·m)], B is the magnetic flux density [T], d represents the length [m] of the path where the interaction between light and magnetic field occurred.

FIG. 22 schematically illustrates an example of polarization rotation of light by a Faraday rotation mirror.

According to FIG. 22, polarization rotation can be performed when light is reflected by a Faraday rotation mirror. Since the rotation angle of the Faraday rotator used in the Faraday rotation mirror is set to 45°, in an ideal case, the polarization rotation of 90° in total is achieved by 45° each when the light is incident on the Faraday rotation mirror and when it is reflected. Therefore, in the Bob→Alice path, the polarization component perpendicular to the optical axis and the polarization component horizontal to the optical axis are reversed in the Alice→Bob path, this means that the two components experience the time delay due to birefringence by being reversed in the Bob→Alice path and the Alice→Bob path. As a result, since both components experience the same time delay as they travel back and forth between Bob and Alice, Bob receives a signal in which the polarization distortion due to birefringence is compensated for in the returned pulse (however, the polarization rotation of 90 degrees by the Faraday rotation mirror is present).

However, commercially available Faraday rotation mirrors do not guarantee a rotation angle of exactly 45° due to process errors and variation according to temperature and wavelength. According to the data sheet provided by General Photonics, commercially available Faraday rotation mirrors have a maximum process error of ±1° at room temperature (23° C.), due to the influence of the Verde constant V, which changes according to temperature and wavelength, it shows variations of ±0.12°/° C. and ±0.12°/nm, respectively, depending on temperature and wavelength.

For example, the specifications of commercially available Faraday rotation mirrors can be summarized as shown in the table below.

TABLE 4

| | | |
|---|---|---|
| Operating Wavelength | 1550 nm, 1310 nm | 1064 nm |
| Operating Bandwidth | ±50 nm | ±5 nm |
| Insertion Loss | 0.3 dB typical 0.5 dB max. | 3.0 dB max. |
| Faraday Rotation Angle | 90 degrees | 90 degrees |
| Rotation Angle Tolerance(Center Wavelength at 23° C.) | ±1 degree | ±6 degrees |
| Rotation Angle Wavelength Dependence | ±0.12 degree/nm | |
| Rotation Angle Temperature Dependence | ±0.12 degree/°C. | PMD: 0.05 ps |
| Reflection Polarization Dependence | 0.5% max. | PDL: 0.05 dB |
| Optical Power Handling | 300 mW min. | 150 mW |
| Operating Temperature | 0 to 70° C. | −5 to 50° C. |
| Storage Temperature | −40 to 85° C. | −40 to 85° C. |
| Fiber Type | SMF-28 | HI 1060 Fiber |
| Dimensions | Ψ 5.5 × 32 mm (pigtailed)Ψ 9.5 × 50 mm (NoTailTM) | Ψ 5.5 × 35 mm (pigtailed) |

The imperfection of these Faraday rotating mirrors not only increases the qbit error rate (QBER) by reducing the compensating effect for birefringence, but also it distorts the state space of the BB84 protocol transmitted by Alice, leaving a security hole. In the case of using an ideal Faraday rotating mirror, the state space of the BB84 state transmitted by Alice can be expressed as follows.

$$|\Phi_k\rangle = \frac{1}{\sqrt{2}}\left(e^{ik\delta}|a\rangle + |b\rangle\right), \quad [\text{Equation 2}]$$

$$k = 0, 1, 2, 3$$

At this time, δ=π/2. k is an index corresponding to a phase state selected by Alice among 0, π/2, π, and 3π/2. |a⟩ and |b⟩ are the time mode vectors of the reference pulses a and b transmitted by Bob, and become the basis vectors of the state space in which the states transmitted by Alice exist. That is, in an ideal case, it can be seen that the state space of the BB84 state transmitted by Alice is a two-dimensional space with two time modes |a⟩ and |b⟩ as basis vectors.

On the other hand, if the Faraday rotation mirror is incomplete, and the rotation angle error due to this is E, the state transmitted by Alice is reconstructed by the following equation.

$$|\Phi_k\rangle = \frac{1}{\sqrt{2}}\left(\sin(2\epsilon)e^{i2k\delta}|aH\rangle + \cos(2\epsilon)e^{ik\delta}|aV\rangle + \sin(2\epsilon)|bH\rangle + \cos(2\epsilon)|bV\rangle\right),$$

$$k = 0, 1, 2, 3$$

[Equation 3]

The above formula shows that the information encoded by Alice appears not only on time modes (a and b) but also on polarization modes (H and V). In order to more clearly confirm the dimension of the state space represented by this equation, it can be organized as the following equation.

$$|H\rangle = \cos(2\epsilon)|X\rangle + \sin(2\epsilon)|Y\rangle, \ |V\rangle = -\sin(2\epsilon)|X\rangle + \cos(2\epsilon)|Y\rangle \quad (4)$$

$$|aX\rangle = |x_1\rangle, \ |aY\rangle = |x_2\rangle, \ |bY\rangle = |x_3\rangle \quad (5)$$

And, rearranging the above equations, it can be redefined as the following equation.

$$|\Phi_k\rangle = \frac{1}{\sqrt{2}}\Big[\sin(2\epsilon)\cos(2\epsilon)\big(e^{i2k\delta} - e^{ik\delta}\big)|x_1\rangle +$$

$$\big\{\sin^2(2\epsilon)e^{i2k\delta} + \cos^2(2\epsilon)e^{ik\delta}\big\}|x_2\rangle + |x_3\rangle\Big],$$

$$k = 0, 1, 2, 3$$

[Equation 6]

Figure 23:
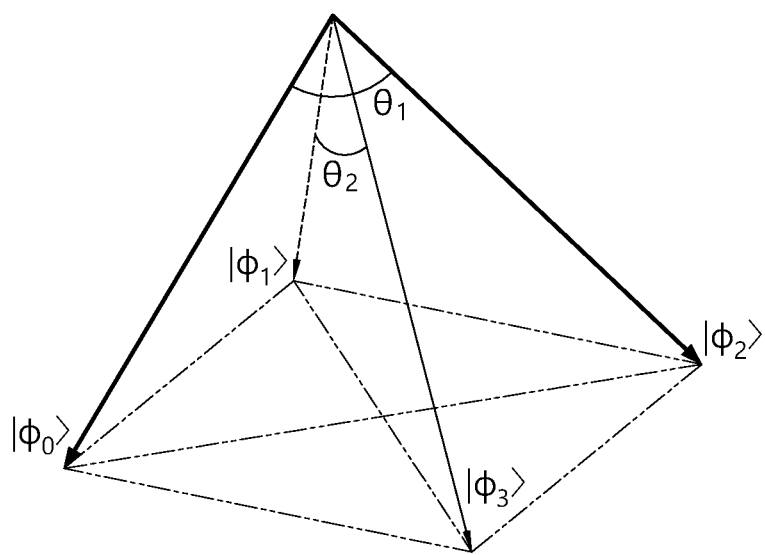
FIG. 23 is a schematic diagram of a state space distorted in three dimensions by the imperfection of a Faraday rotating mirror.

FIG. 23 is a schematic diagram of a state space distorted in three dimensions by the imperfection of a Faraday rotating mirror.

Therefore, the Hilbert space of the information transmitted by Alice is no longer a two-dimensional space, but a three-dimensional space, if the four types of information Alice can transmit are plotted on this 3D space, the result shown in FIG. 23 is obtained. Eve finds a POVM (positive operator valued measure) operator that minimizes the qubit error rate between Alice and Bob for the four states represented by the above formula, it is possible to clearly distinguish between four states, based on the state information classified in this way, a PFM attack (passive Faraday rotator mirror attack) that applies an intercept-resend attack is possible.

In summary, due to the distortion of the state space caused by the incompleteness of the Faraday rotating mirror, the state of the information transmitted by Alice no longer follows the state of the BB84 protocol, the three-dimensional distorted state space provides Eve with a security loophole, enabling PFM attacks. Therefore, Alice and Bob need an additional solution to defend the PFM attack and maintain the original security of the BB84 protocol even in the PnP quantum key distribution method.

Hereinafter, the present specification will be described in more detail.

The present specification relates to a technique for quantum key distribution (QKD) in a quantum secure communication system. More specifically, by correcting the polarization distortion caused by the imperfection of the Faraday rotator mirror, a key element of the Plug & Play (PnP) quantum key distribution system, it relates to a method and apparatus for defending against a passive Faraday rotator mirror attack (PFM attack).

In the present specification, a method and system for measuring and correcting an error of a Faraday rotating mirror so that a commercially available Faraday rotating mirror operates in or close to an ideal state is proposed. The system proposed in this specification includes an error measurement device using a polarizer and an error correction device based on a variable Faraday rotator mirror (VFM) configuration. In the following, the present specification will be described by classifying the contents into an error measurement method and device and an error correction method and device.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 24:
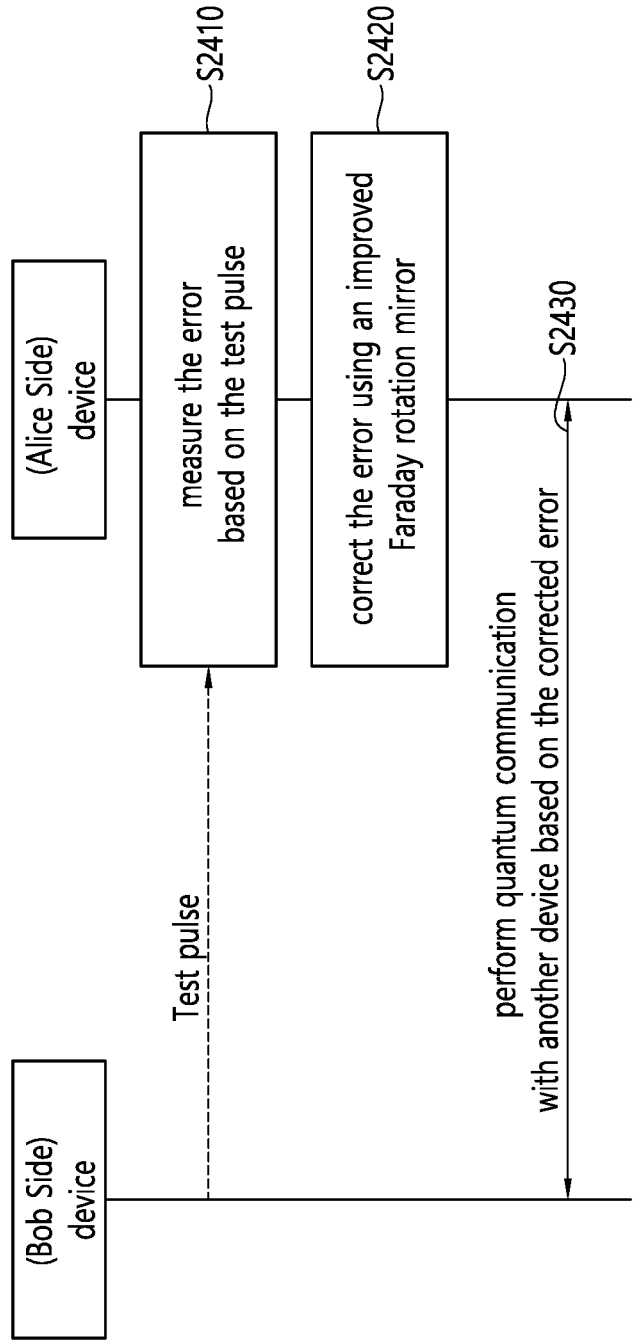
FIG. 24 is a flowchart of a method for correcting an error using an improved Faraday rotating mirror according to an embodiment of the present specification.

FIG. 24 is a flowchart of a method for correcting an error using an improved Faraday rotating mirror according to an embodiment of the present specification.

According to FIG. 24, the device may measure the error based on the test pulse (S2410). Here, the device may correspond to the device of the Alice side described above and/or described later.

Meanwhile, for example, the test pulse may be a pulse generated by the other device and received by the device from the other device. Alternatively, the test pulse may be a pulse generated by the device.

For example, the value of the error may be determined based on a size of a test pulse and a size of a component detected by an optical sensor of the device.

Here, for example, the size of the component detected by the optical sensor may be determined based on that the test pulse passes through the polarizer, a pulse passing through the polarizer is reflected on the improved Faraday rotating mirror, the reflected pulse passes through the polarizer again, and a component that has passed through the polarizer is detected by the optical sensor.

Here, for example, the value of the error is determined as follows, $\epsilon = \sin\hat{}(-1)(E\_e/E\_T)$, the $\epsilon$ is the value of the error, the E_e is a value for the size of the component detected by the optical sensor, the E_T may be a value for the magnitude of the test pulse.

The device may correct the error using an improved Faraday rotation mirror of the device (S2420).

For example, the improved Faraday rotation mirror may be a device that includes more solenoids than the legacy Faraday rotation mirror.

Here, for example, the error may be corrected based on adjusting the strength of the current of the solenoid.

Here, for example, the value of the current may be determined based on at least one of the value of the error, the permeability of the medium, the Verde constant, or the total number of wires.

Here, for example, the legacy Faraday rotation mirror may be an element including a Faraday rotor and a mirror composed of permanent magnets.

The device may perform quantum communication with another device based on the corrected error (S2430). Here, the other device may correspond to a Bob Side device described above and/or described later.

In the case of the embodiments/examples described above, specific examples will be described later for convenience of description.

Meanwhile, the above-described device may be, for example, a device including a QKD transmitter (i.e., Alice side) and an encoder (and/or decoder). In addition, the other device may be a device including a QKD receiving unit (i.e., bob side) and a decoder (and/or an encoder).

Examples of the device and other devices may be described as follows through drawings.

Figure 25:
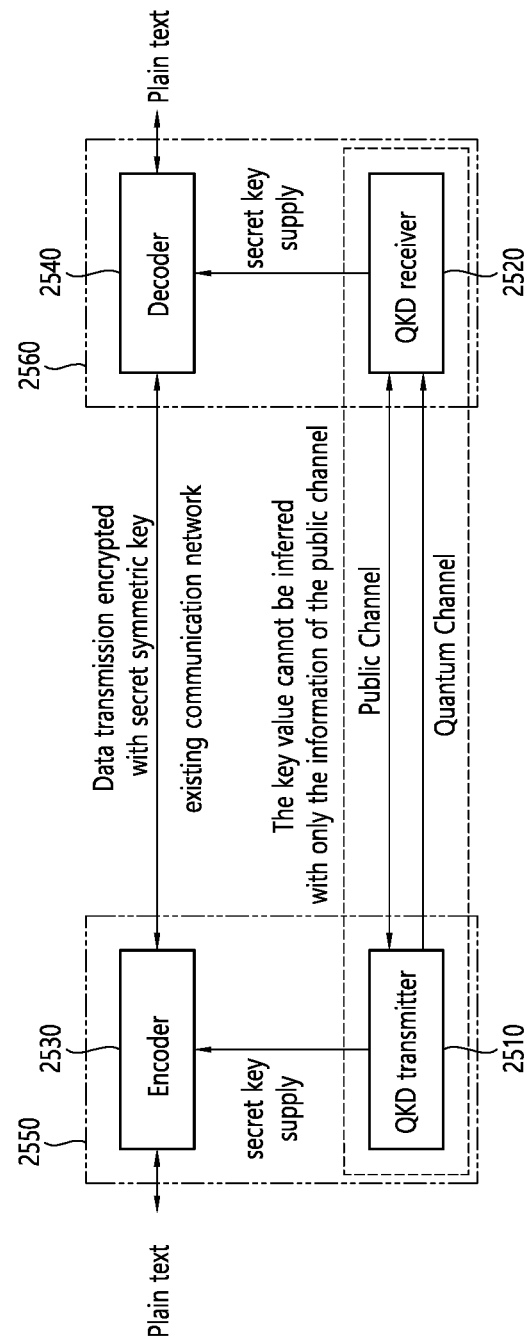
FIG. 25 schematically illustrates an example of a device according to an embodiment of the present specification.

FIG. 25 schematically illustrates an example of a device according to an embodiment of the present specification.

According to FIG. 25, a quantum key distribution (QKD) transmitter 2510 may perform communication by being connected to a QKD receiver 2520 through a public channel and a quantum channel.

At this time, the QKD transmitter 2510 may supply a secret key to the encrypter 2530, and the QKD receiver 2520 may also supply a secret key to the decryptor 2540. Here, plain text may be input/output to the encryptor 2530, the encryptor 2530 may transmit data encrypted with the secret symmetric key to the decryptor 1940 (through an existing communication network). In addition, plain text may be input/output to the decoder 2540.

Here, the encrypter and decryptor may transmit/receive data through the communication network as described above, the communication network herein may mean, for example, a communication network in the 3GPP series (eg, an LTE/LTE-A/NR based communication network), a communication network in the IEEE series, and the like.

Meanwhile, the encryptor 2530 and the QKD transmitter 2510 may be included in one device 2550, and the decryptor 2540 and the QKD receiver 2520 may also be included in one device 2560.

For reference, in the drawing, for convenience of explanation, a configuration including only an encryptor 2530 and a QKD transmitter 2510 in one device 2550 is illustrated, but the above single device 2550 may also include a QKD transmitter 2510 and an encryptor 2530 as well as a separate decryptor. Similarly, a decoder 2540 and a QKD receiver 2520 as well as a separate encoder may also be included in one device 2560.

Hereinafter, an embodiment of a communication method for a case in which a QKD receiver and a decoder (and/or an encoder (encoder)) are included in one device will be schematically described through drawings.

Figure 26:
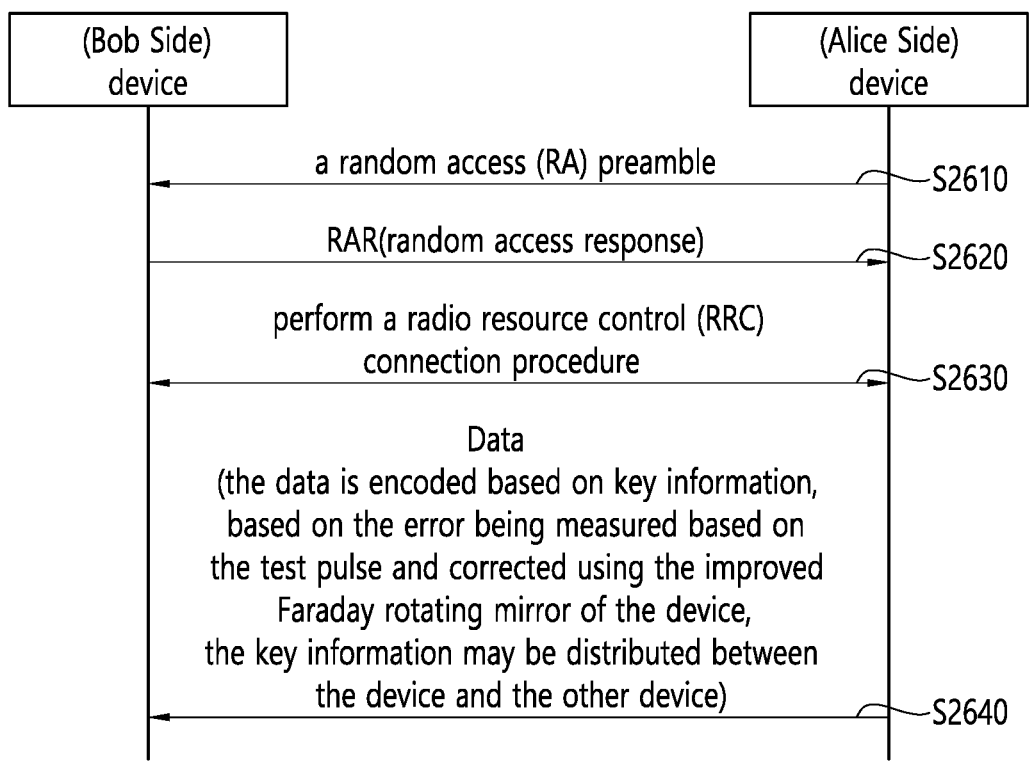
FIG. 26 is a flowchart of a method of correcting an error using an improved Faraday rotating mirror according to another embodiment of the present specification.

FIG. 26 is a flowchart of a method of correcting an error using an improved Faraday rotating mirror according to another embodiment of the present specification.

According to FIG. 26, a device may transmit a random access (RA) preamble to another device (S2610).

The device may receive a random access response (RAR) from the other device in response to the RA preamble (S2620). As described above, the device herein may correspond to a device including at least one of a QKD receiver, a decoder, and/or an encoder (encoder). In addition, as described above, another device herein may correspond to a device including at least one of a QKD transmitter, an encoder (encoder), and/or a decoder. Since a detailed description of this is as described above and/or described later, repeated description of overlapping contents will be omitted for convenience of explanation.

The device may perform a radio resource control (RRC) connection procedure with the other device (S2630). Since a detailed description of this is as described above and/or described later, repeated description of overlapping contents will be omitted for convenience of explanation.

The device may transmit data to the other device (S2640). Since a detailed description of this is as described above and/or described later, repeated description of overlapping contents will be omitted for convenience of explanation.

Here, the data is encoded based on key information, based on the error being measured based on the test pulse and corrected using the improved Faraday rotating mirror of the device, the key information may be distributed between the device and the other device. Since a detailed description of this is as described above and/or described later, repeated description of overlapping contents will be omitted for convenience of explanation.

Hereinafter, the above-described embodiments will be described in more detail.

Figure 27:
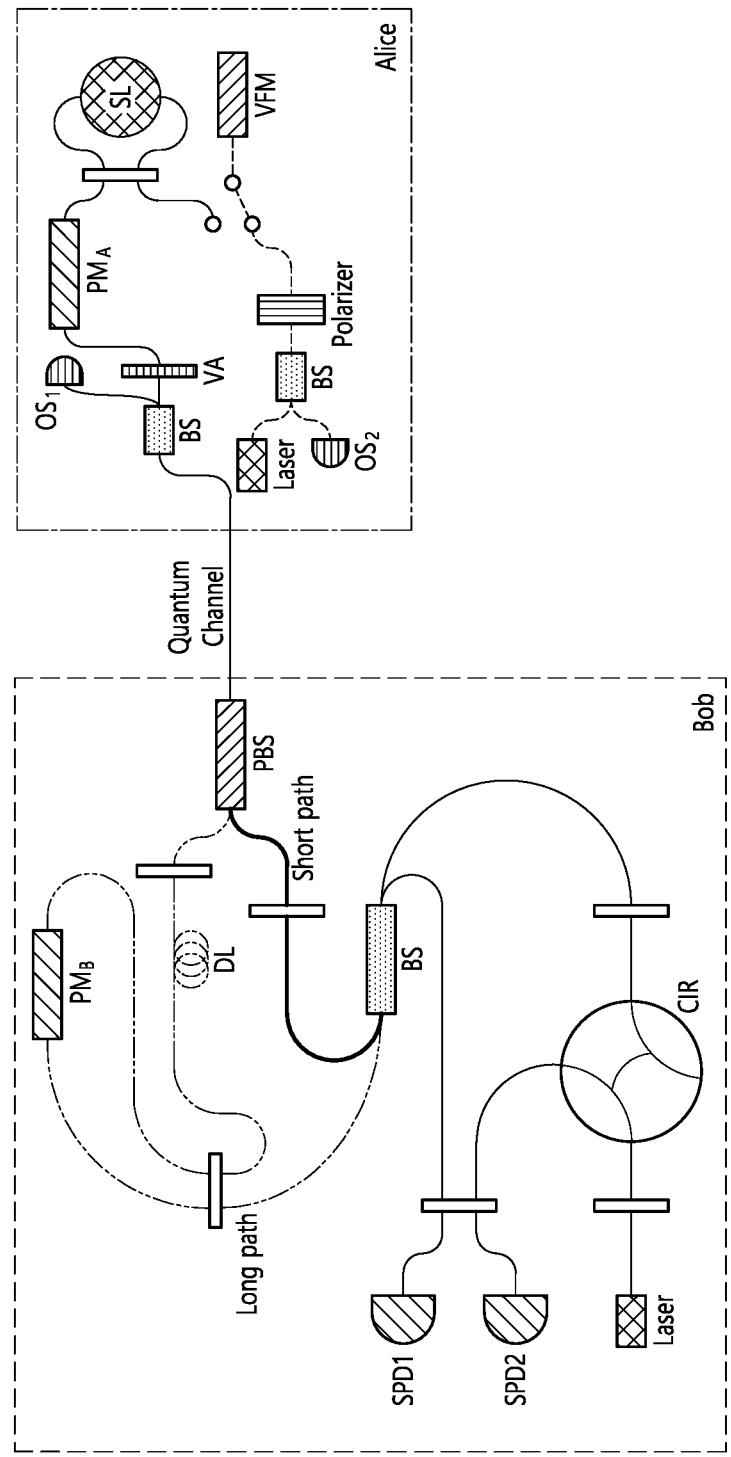
FIG. 27 schematically illustrates an example of a PnP quantum key distribution system for generating test pulses with Alice's light source based on the present specification, FIG. 28 schematically illustrates an example of a PnP quantum key distribution system generating test pulses with Bob's light source.
Figure 28:
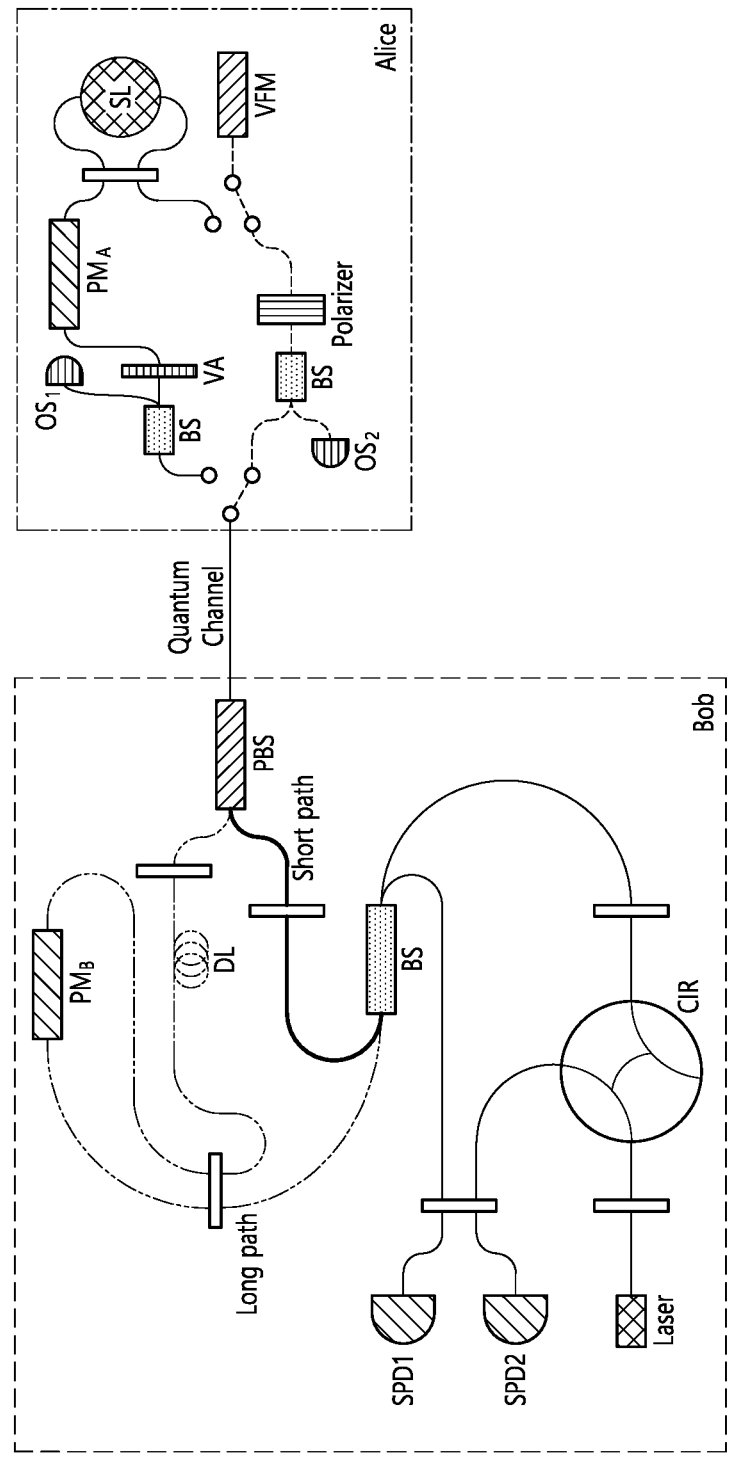

FIG. 27 schematically illustrates an example of a PnP quantum key distribution system for generating test pulses with Alice's light source based on the present specification, FIG. 28 schematically illustrates an example of a PnP quantum key distribution system generating test pulses with Bob's light source.

In other words, FIGS. 27 and 28 are configuration examples of a PnP quantum key distribution system including a device for measuring and correcting an error of a Faraday rotating mirror proposed in this specification, a circuit (yellow line) for measuring and correcting an error of a Faraday rotating mirror is added to the conventional PnP quantum key distribution system shown in FIG. 20.

In the PnP quantum key distribution system based on the proposal of this specification, before Bob transmits the reference pulse train for secret key generation, a procedure of measuring and correcting the error of the Faraday rotating mirror using a test pulse is performed. Generation of test pulses can be both a method that Alice creates by herself by placing a light source such as a laser on the Alice side (FIG. 27) and a method of generating using a laser placed on the Bob side to lighten the weight on the Alice side and transmitting the data to the Alice side through a quantum channel (FIG. 28).

1. Method and Device for Measuring Rotation Angle Error of Faraday Rotating Mirror FIG. 29 schematically shows a rotation angle error detection circuit of a Faraday rotation mirror.

Figure 29:
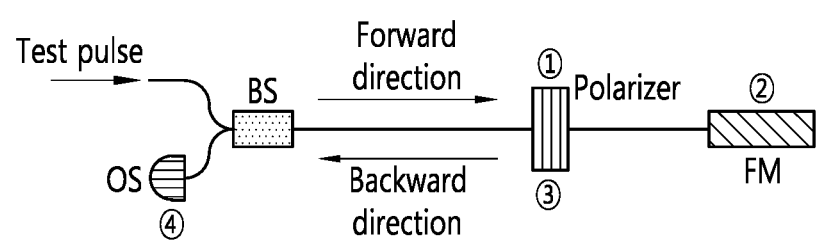
FIG. 29 schematically shows a rotation angle error detection circuit of a Faraday rotation mirror.

A system for measuring the rotation angle error of a Faraday rotating mirror is composed of a polarizer and an optical sensor (OS) as shown in FIG. 29. The polarization direction of the polarizer is set to coincide with the polarization direction of the test pulse. The ideal rotation angle of the Faraday rotation mirror is set to 45°, and the actual rotation angle including process error and rotation angle variation according to temperature and wavelength is $45+\epsilon°$.

When the test pulse is incident on the error extraction system, it passes through the polarizer (①), after being reflected (②) on the Faraday rotating mirror, it passes through the same polarizer again with the polarization rotated by $90+2\epsilon°$ than the polarization at the time of incidence (③), at this time, only the components passing through the polarizer reach the optical sensor (④).

Figure 31:
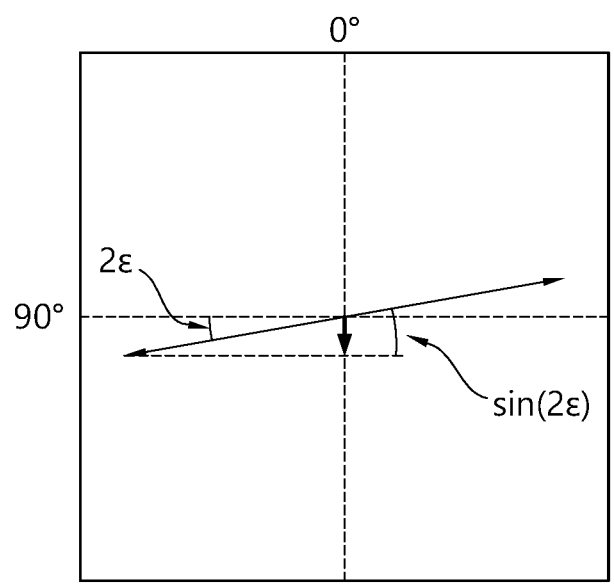

FIG. 30 shows an example of the operation of the error detection circuit for an ideal Faraday rotating mirror, FIG. 31 schematically shows the error components detected for an imperfect Faraday rotation mirror.

Figure 32:
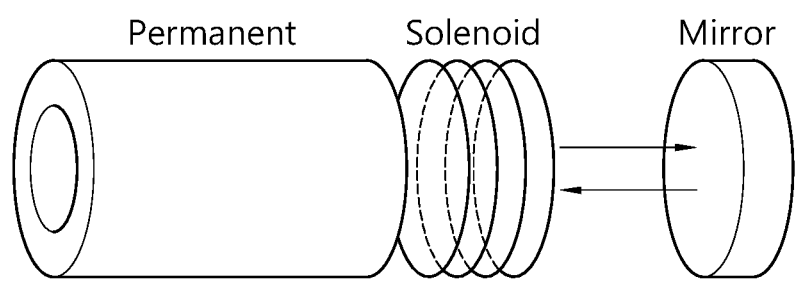
FIG. 32 schematically shows an example of the structure of a variable Faraday rotation mirror.

In the ideal case, since $\epsilon=0$, the polarization of the reflected pulse is exactly orthogonal to the polarization direction of the polarizer, and is completely blocked at ③, the component reaching the optical sensor becomes zero (FIG. 31). If the error of the Faraday rotating mirror exists and $|\epsilon|>0$, as shown in FIG. 32, the component corresponding to sin(2ε) in the polarization of the reflected pulse passes through the polarizer, by analyzing this component in the optical sensor, information about the error c of the Faraday rotating mirror can be obtained. If the size of the original test pulse is E_T, the size of the component detected by the optical sensor due to the error E_e and ε have the following formula.

$$\epsilon = \sin^{-1}\frac{E_e}{E_T} \quad \text{[Equation 7]}$$

2. Method and Device for Correcting Rotation Angle Error of Faraday Rotating Mirror FIG. 32 schematically shows an example of the structure of a variable Faraday rotation mirror.

As shown in FIG. 32, a device for correcting a rotation angle error of a Faraday rotating mirror is composed of a Faraday rotor composed of a permanent magnet, a mirror, and a solenoid. A variable Faraday rotator mirror (VFM) is constructed by adding a solenoid for forming an induced magnetic field to a conventional Faraday rotating mirror structure composed of a Faraday rotor and a mirror.

When current flows through the solenoid, an induced magnetic field is formed according to Ampere's law, and the magnitude and direction of the induced magnetic field can be controlled by adjusting the magnitude and direction of this current. At this time, if the strength of the current flowing through the solenoid is I[A], the induced magnetic field B_i[T] formed is determined by the following formula.

$$B_i = \mu/n \quad (8)$$

Where μ[H/m] is the permeability of the medium and n is the number of coils per unit length. If the length of the solenoid is L and the total number of wires wound around the solenoid is N, then n=N/L.

Using Faraday's law, it can be seen that the magnitude of the induced magnetic field B_i required for the variable Faraday rotating mirror is as follows from the error ε obtained through the error detection device.

$$B_i = \frac{\epsilon}{VL} \quad \text{[Equation 9]}$$

At this time, the current strength of the solenoid required to form the induced magnetic field is calculated as follows.

$$I = \frac{B_i}{\mu n} = \frac{\epsilon}{VL} \cdot \frac{1}{\mu n} = \frac{\epsilon}{\mu NV} \quad \text{[Equation 10]}$$

Depending on the sign of ε, the direction of the current can be either clockwise or counterclockwise to cancel it out.

Figure 33:
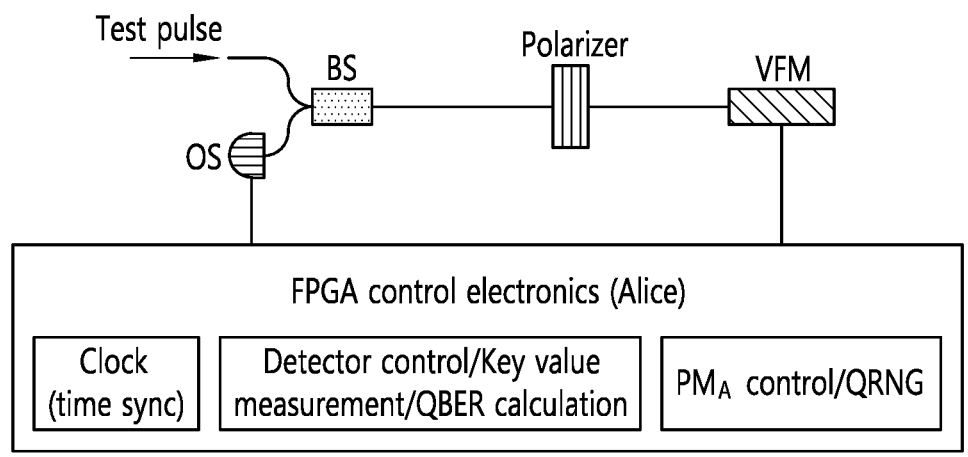
FIG. 33 schematically illustrates an example of a rotation angle error correcting device for a Faraday rotation mirror.

FIG. 33 schematically illustrates an example of a rotation angle error correcting device for a Faraday rotation mirror.

An error measurement and correction circuit as shown in FIG. 33 can be configured by combining the error detection circuit of FIG. 29 and the variable Faraday rotation mirror for error correction of FIG. 32. The error component information detected through the optical sensor is input as information for adjusting the induced magnetic field of the variable Faraday rotating mirror. If necessary, by repeating the error measurement and correction process using several test pulses, it is possible to more precisely find an optimal operating point that closes the rotation angle error of the Faraday rotating mirror to zero.

As shown in FIG. 7, in a system in which Alice performs error correction by generating a test pulse with her own light source, Alice and Bob may share a time interval for error correction of the Faraday rotating mirror in advance. At this time, the direction of the polarizer included in the error detection circuit may be previously set to coincide with the polarization direction of the test pulse generated by Alice's light source.

As shown in FIG. 28, in a system in which Bob generates test pulses and transmits them to Alice, Alice and Bob may always perform an error correction procedure of a Faraday rotating mirror before transmitting a reference pulse for generating a secret key, an error correction procedure of a Faraday rotating mirror may be performed using a previously shared time interval. At this time, the direction of the polarizer included in the error detection circuit may be pre-adjusted to match the polarization direction of the test pulse that Alice has received from Bob's light source.

That is, the time interval for error correction of the Faraday rotation mirror can be shared between Alice and Bob. Here, the error measurement and correction procedure can be preceded by the conventional PnP quantum key distribution method, error measurement and correction procedures may be performed using a pre-agreed time interval.

For example, the device may share information about a time resource for correction with the other device through an existing communication network. In this case, the time resource for the correction may include a resource for transmitting a test pulse through a quantum channel. In addition, such control information may be transmitted through PDSCH, PDCCH, PBCH, etc. of an existing communication network (eg, LTE/LTE-A/NR in 3gpp).

Here is a summary of what has been said above: The present specification proposes a method and apparatus for detecting and correcting a rotation angle error due to a process error and a variation according to time and wavelength in a commercially available Faraday rotation mirror. Based on the proposed method and device, an imperfect Faraday rotation mirror can be calibrated to operate as an ideal Faraday rotation mirror, this eliminates the security loophole caused by the imperfection of the Faraday rotating mirror to defend against PFM attacks and ensure that the PnP quantum key distribution system guarantees the ideal security of the BB84 protocol as it is.

The previously described embodiments will be described again from various viewpoints (methods, various types of devices, recording media, etc.).

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 34:
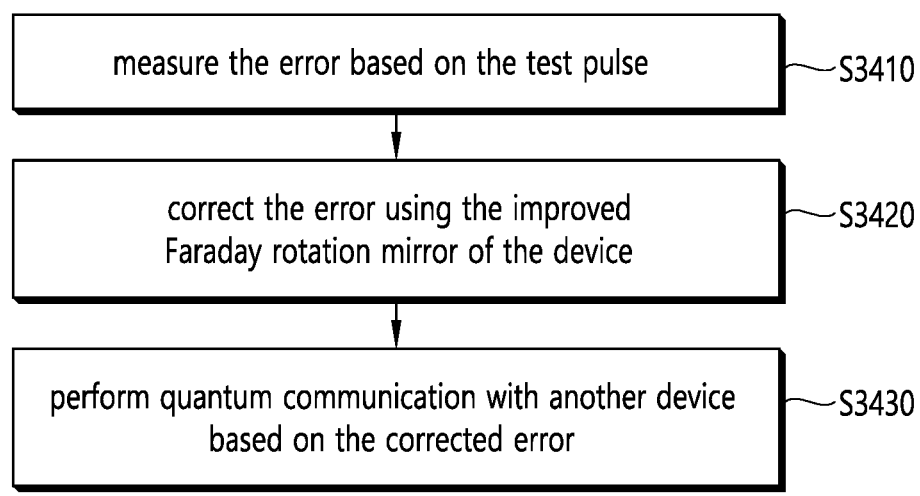
FIG. 34 is a flowchart of a method for correcting an error using an improved Faraday rotating mirror on the side of an Alice side device according to an embodiment of the present specification.

FIG. 34 is a flowchart of a method for correcting an error using an improved Faraday rotating mirror on the side of an Alice side device according to an embodiment of the present specification.

According to FIG. 34, the device may measure the error based on the test pulse (S3410). Here, since a more specific example of the present embodiment is as described above, repetitive description of overlapping contents for convenience of explanation will be omitted.

The device may correct the error using the improved Faraday rotation mirror of the device (S3420). Here, since a more specific example of the present embodiment is as described above, repetitive description of overlapping contents for convenience of explanation will be omitted.

The device may perform quantum communication with another device based on the corrected error (S3430). Here, since a more specific example of the present embodiment is as described above, repetitive description of overlapping contents for convenience of explanation will be omitted.

Figure 35:
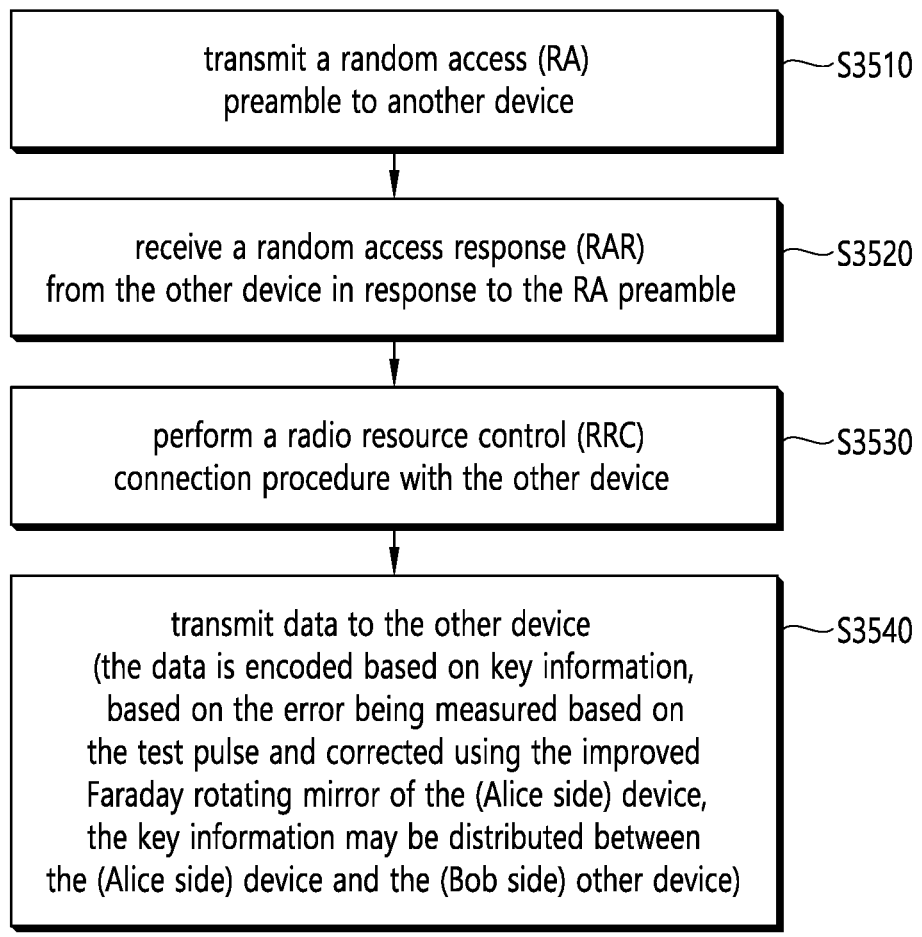
FIG. 35 is a flowchart of a method of correcting an error using an improved Faraday rotation mirror on the Alice side device side according to another embodiment of the present specification.

FIG. 35 is a flowchart of a method of correcting an error using an improved Faraday rotation mirror on the Alice side device side according to another embodiment of the present specification.

According to FIG. 35, a device may transmit a random access (RA) preamble to another device (S3510). Since a detailed description of this is as described above and/or described later, repeated description of overlapping contents will be omitted for convenience of explanation.

The device may receive a random access response (RAR) from the other device in response to the RA preamble (S3520). As described above, the device herein may correspond to a device including at least one of a QKD receiver, a decoder, and/or an encoder (encoder). In addition, as described above, another device herein may correspond to a device including at least one of a QKD transmitter, an encoder (encoder), and/or a decoder. Since a detailed description of this is as described above and/or described later, repeated description of overlapping contents will be omitted for convenience of explanation.

The device may perform a radio resource control (RRC) connection procedure with the other device (S3530). Since a detailed description of this is as described above and/or described later, repeated description of overlapping contents will be omitted for convenience of explanation.

The device may transmit data to the other device (S3540). Since a detailed description of this is as described above and/or described later, repeated description of overlapping contents will be omitted for convenience of explanation.

Here, the data is encoded based on key information, based on the error being measured based on the test pulse and corrected using the improved Faraday rotating mirror of the device, the key information may be distributed between the device and the other device. Since a detailed description of this is as described above and/or described later, repeated description of overlapping contents will be omitted for convenience of explanation.

Figure 36:
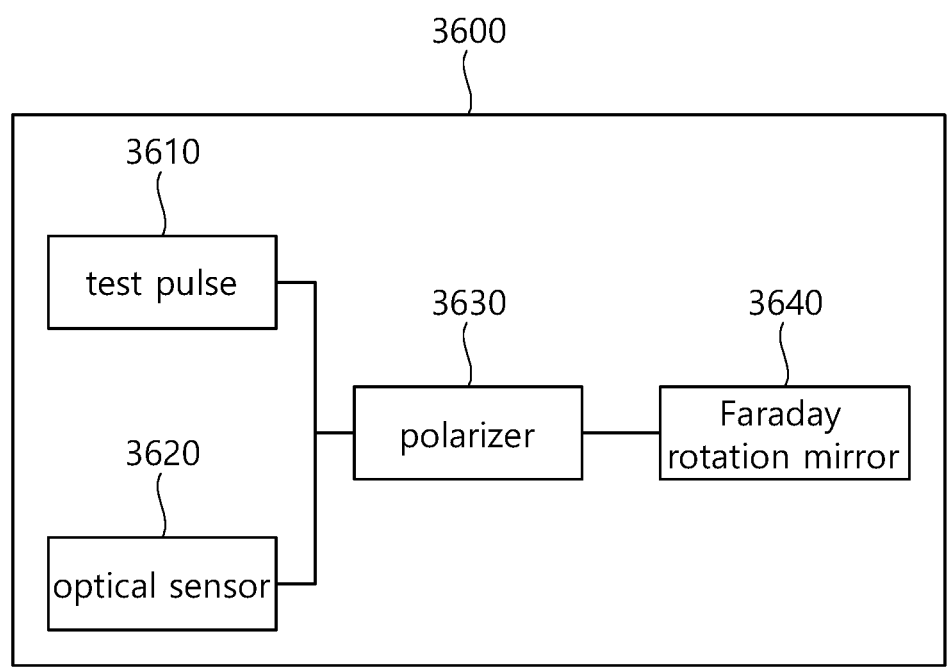
FIG. 36 schematically illustrates an example of a block diagram of an apparatus for correcting an error using an improved Faraday rotation mirror on an Alice side, according to an embodiment of the present specification.

FIG. 36 schematically illustrates an example of a block diagram of an apparatus for correcting an error using an improved Faraday rotation mirror on an Alice side, according to an embodiment of the present specification.

According to FIG. 36, an apparatus 3600 may include an optical sensor 3620, a polarizer 3630, and a Faraday rotation mirror 3640.

The polarizer 3630 may polarize the test pulse 3610 and the first pulse. Here, the test pulse 3610 may be generated from a laser diode (not separately shown) of the (Alice Side) device 3600 as described above. Also, as described above, the test pulse 3610 may be a pulse generated by a (Bob side) device and transmitted from the (Bob side) device. Since a detailed description of this is as described above and/or described later, repeated description of overlapping contents will be omitted for convenience of explanation.

Here, the first pulse may be a pulse related to a pulse reflected from the improved Faraday rotating mirror 3640. Since a detailed description of this is as described above and/or described later, repeated description of overlapping contents will be omitted for convenience of explanation.

The improved Faraday rotation mirror 3640 can reflect the second pulse. Here, the improved Faraday rotation mirror 3640 may be a device that supports correcting an error of the Faraday rotation mirror 3640. Since a detailed description of this is as described above and/or described later, repeated description of overlapping contents will be omitted for convenience of explanation.

Here, the second pulse may be a pulse related to the test pulse 3610 polarized through the polarizer 3630.

The optical sensor 3620 can detect a specific component. Since a detailed description of this is as described above and/or described later, repeated description of overlapping contents will be omitted for convenience of explanation.

Here, the specific component may be a component of the first pulse polarized through the polarizer 3630.

Although not shown separately, the present example may be described in another form as follows.

As an example, an apparatus may comprise a transceiver, at least one memory and at least one processor operably coupled with the at least one memory and the transceiver, wherein the at least one processor is configured to control the transceiver to transmit a random access (RA) preamble to another apparatus, control the transceiver to receive a random access response (RAR) from the another apparatus in response to the RA preamble, perform a radio resource control (RRC) connection procedure with the another apparatus and control the transceiver to transmit data to the another apparatus, wherein the data is encoded based on key information, wherein the key information is distributed between the apparatus and the another apparatus based on that an error is measured based on a test pulse and the error is corrected using an improved Faraday rotation mirror of the apparatus.

As an example, an apparatus may comprise at least one memory and at least one processor operably coupled to the at least one memory, wherein the at least one processor is configured to control a transceiver to transmit a random access (RA) preamble to another apparatus, control the transceiver to receive a random access response (RAR) from the another apparatus in response to the RA preamble, perform a radio resource control (RRC) connection procedure with the another apparatus and control the transceiver to transmit data to the another apparatus, wherein the data is encoded based on key information, wherein the key information is distributed between the apparatus and the another apparatus based on that an error is measured based on a test pulse and the error is corrected using an improved Faraday rotation mirror of the apparatus.

As an example, at least one computer readable medium containing instructions based on being executed by at least one processor is provided, wherein the at least one processor is configured to control a transceiver to transmit a random access (RA) preamble to another apparatus, control the transceiver to receive a random access response (RAR) from the another apparatus in response to the RA preamble, perform a radio resource control (RRC) connection procedure with the another apparatus and control the transceiver to transmit data to the another apparatus, wherein the data is encoded based on key information, wherein the key information is distributed between the apparatus and the another apparatus based on that an error is measured based on a test pulse and the error is corrected using an improved Faraday rotation mirror of the apparatus.

As an example, an apparatus may comprise a transceiver, at least one memory and at least one processor operably coupled with the at least one memory and the transceiver, wherein the at least one processor is configured to measure an error based on a test pulse, correct the error using an improved Faraday rotation mirror and perform quantum communication based on the corrected error.

Figure 37:
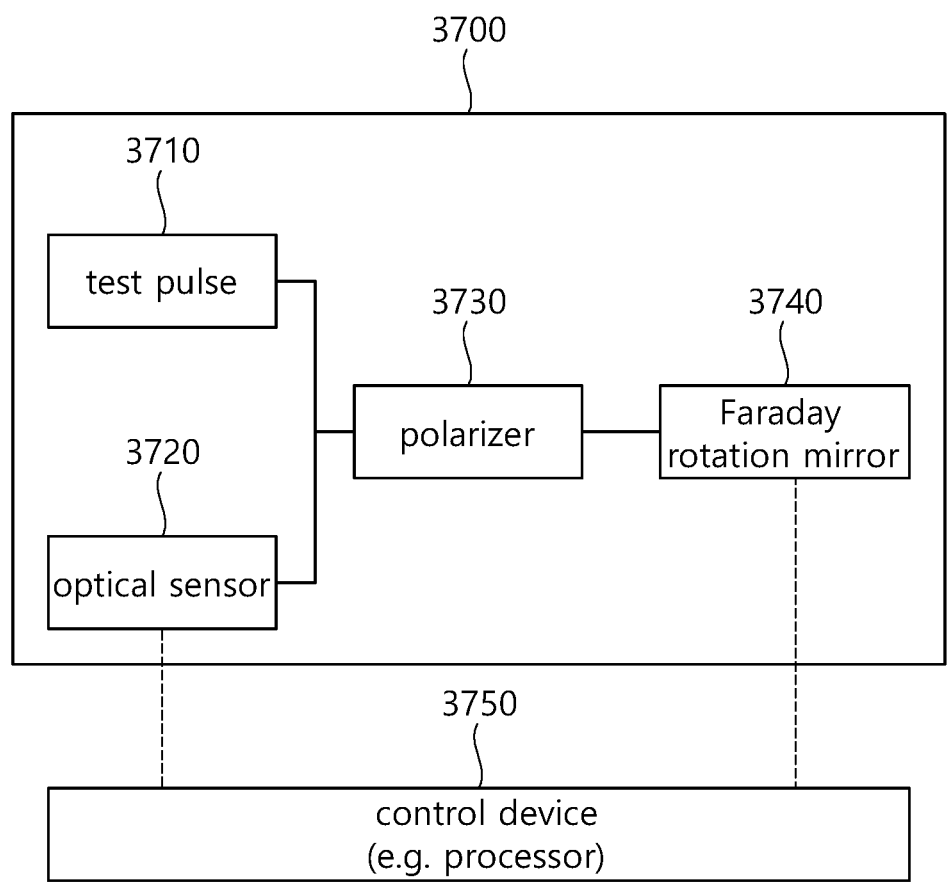
FIG. 37 schematically illustrates an example of a block diagram of an apparatus for correcting an error using an improved Faraday rotation mirror on the Alice side according to another embodiment of the present specification.

FIG. 37 schematically illustrates an example of a block diagram of an apparatus for correcting an error using an improved Faraday rotation mirror on the Alice side according to another embodiment of the present specification.

According to FIG. 37, an apparatus 3700 may include an optical sensor 3720, a polarizer 3730, and a Faraday rotation mirror 3740.

Meanwhile, the control device (e.g. processor) 3750 may control the device 3700, the control device 3750 may exist separately from the device 3700, for example. In addition, the device in this specification may include a transceiver and/or memory to be described later.

The polarizer 3730 may polarize the test pulse 3710 and the first pulse. Here, the test pulse 3710 may be generated from a laser diode (not separately shown) of the (Alice Side) device 3700 as described above. Also, as described above, the test pulse 3710 may be a pulse generated by a (Bob side) device and transmitted from the (Bob side) device. Since a detailed description of this is as described above and/or described later, repeated description of overlapping contents will be omitted for convenience of explanation.

Here, the first pulse may be a pulse related to a pulse reflected from the improved Faraday rotating mirror 3740. Since a detailed description of this is as described above and/or described later, repeated description of overlapping contents will be omitted for convenience of explanation.

The improved Faraday rotation mirror 3740 can reflect the second pulse. Here, the improved Faraday rotation mirror 3740 may be a device that supports correcting an error of the Faraday rotation mirror 3740. Since a detailed description of this is as described above and/or described later, repeated description of overlapping contents will be omitted for convenience of explanation.

Here, the second pulse may be a pulse related to the test pulse 3710 polarized through the polarizer 3730.

The optical sensor 3720 can detect a specific component. Since a detailed description of this is as described above and/or described later, repeated description of overlapping contents will be omitted for convenience of explanation Here, the specific component may be a component of the first pulse polarized through the polarizer 3730.

On the other hand, the control device (e.g. processor) 3750 may correspond to the processor described above or to be described later, since a detailed description of this is as described above and/or described later, repeated description of overlapping contents will be omitted for convenience of explanation.

Figure 38:
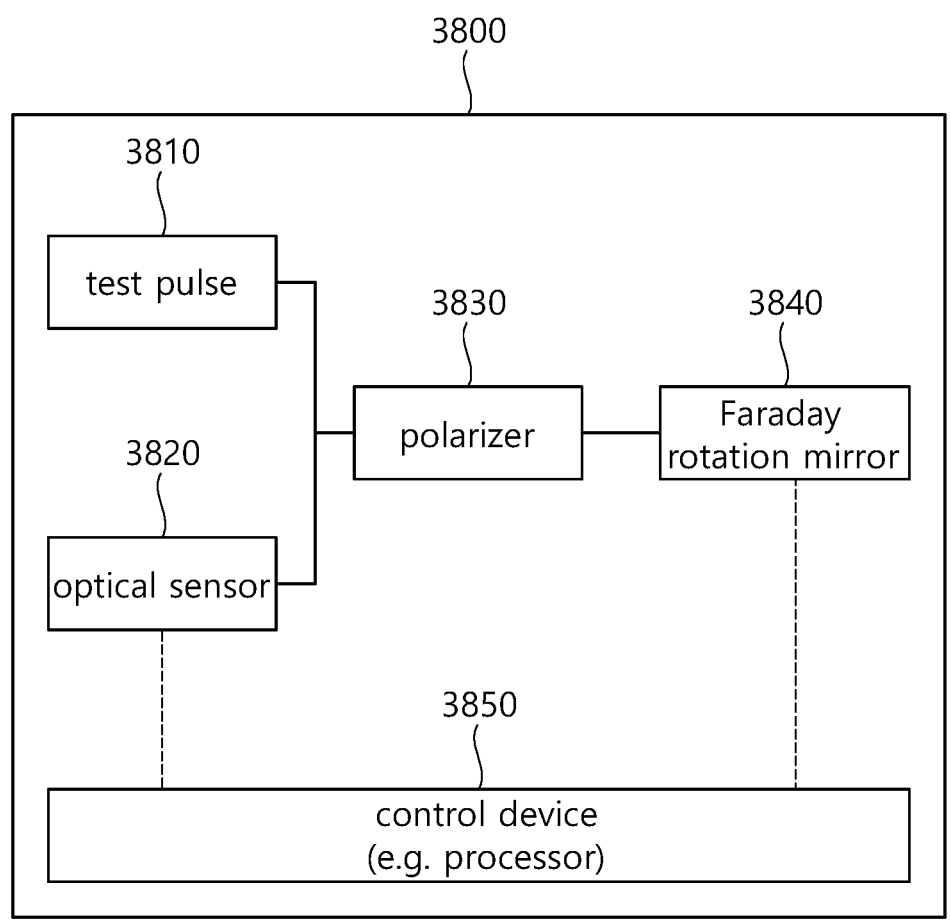
FIG. 38 schematically illustrates an example of a block diagram of an apparatus for correcting an error using an improved Faraday rotating mirror on the Alice side according to another embodiment of the present specification.

FIG. 38 schematically illustrates an example of a block diagram of an apparatus for correcting an error using an improved Faraday rotating mirror on the Alice side according to another embodiment of the present specification.

According to FIG. 38, an apparatus 3800 may include an optical sensor 3820, a polarizer 3830, and a Faraday rotation mirror 3840.

Meanwhile, the control device (e.g. processor) 3850 may control the device 3800, control device 3850 may exist as part of device 3800, for example. In addition, the device in this specification may include a transceiver and/or memory to be described later.

The polarizer 3830 may polarize the test pulse 3810 and the first pulse. Here, the test pulse 3810 may be generated from a laser diode (not separately shown) of the (Alice Side) device 3800 as described above. Also, as described above, the test pulse 3810 may be a pulse generated by a (Bob side) device and transmitted from the (Bob side) device. Since a detailed description of this is as described above and/or described later, repeated description of overlapping contents will be omitted for convenience of explanation.

Here, the first pulse may be a pulse related to a pulse reflected from the improved Faraday rotating mirror 3840. Since a detailed description of this is as described above and/or described later, repeated description of overlapping contents will be omitted for convenience of explanation.

The improved Faraday rotation mirror 3840 can reflect the second pulse. Here, the improved Faraday rotation mirror 3840 may be a device that supports correcting an error of the Faraday rotation mirror 3840. Since a detailed description of this is as described above and/or described later, repeated description of overlapping contents will be omitted for convenience of explanation.

Here, the second pulse may be a pulse related to the test pulse 3810 polarized through the polarizer 3830.

The optical sensor 3820 can detect a specific component. Since a detailed description of this is as described above and/or described later, repeated description of overlapping contents will be omitted for convenience of explanation.

Here, the specific component may be a component of the first pulse polarized through the polarizer 3830.

On the other hand, the control device (e.g. processor) 3850 may correspond to the processor described above or to be described later, since a detailed description of this is as described above and/or described later, repeated description of overlapping contents will be omitted for convenience of explanation.

Figure 39:
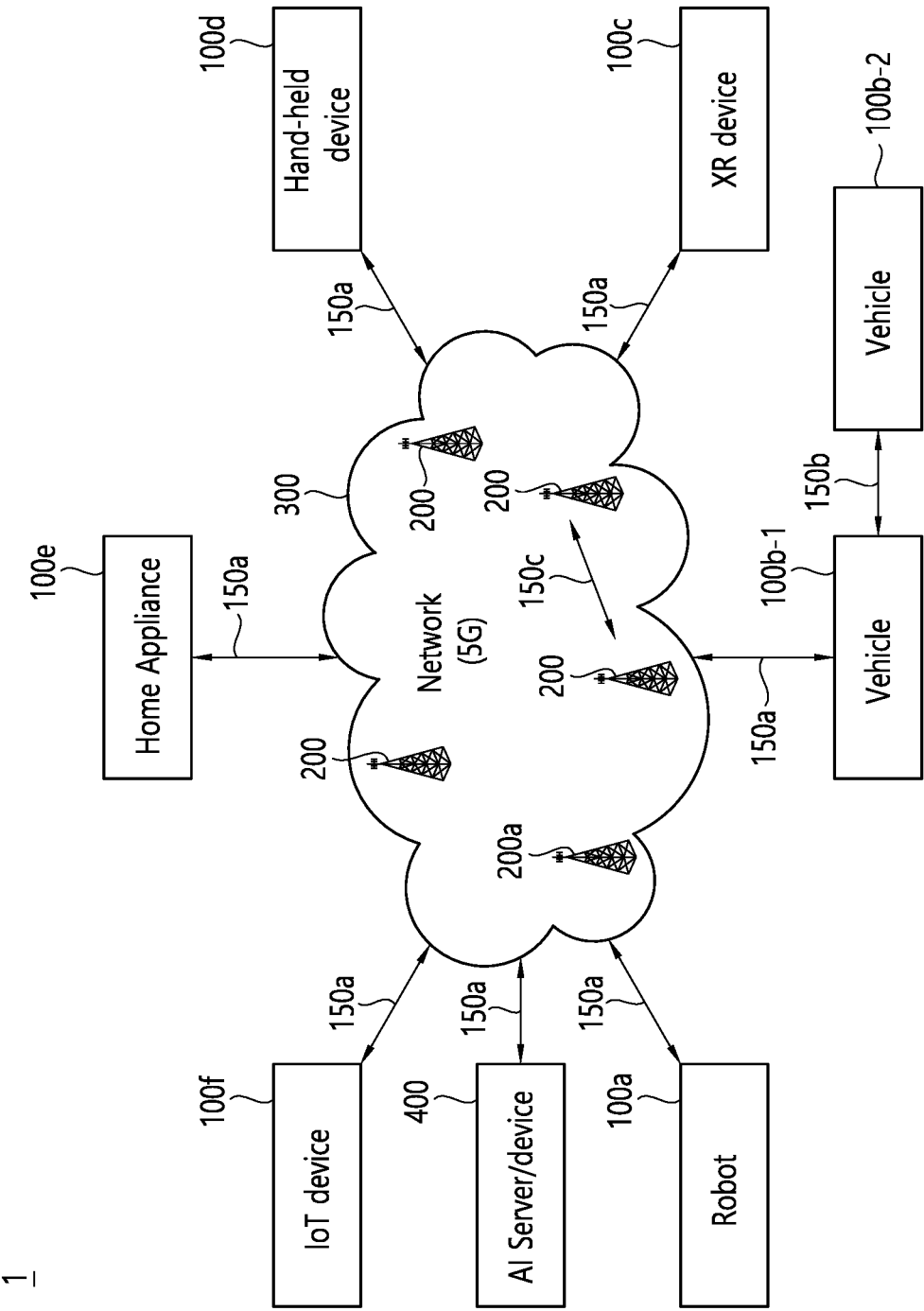
FIG. 39 illustrates the communication system 1 applied to this specification.

FIG. 39 shows a communication system (1), in accordance with an embodiment of the present disclosure.

Referring to FIG. 39, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 5 below. For convenience of explanation, among the frequency ranges used in the NR system, FR1 may mean "sub 6 GHz range" and FR2 may mean "above 6 GHz range" and may be called millimeter wave (mmW).

TABLE 5

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the number of frequency ranges of the NR system can be changed. For example, FR1 may include a band of 410 MHz to 7125 MHz as shown in Table 6 below. That is, FR1 may include a frequency band of 6 GHz (or 5850, 5900, 5925 MHz, etc.) or higher. For example, a frequency band of 6 GHz (or 5850, 5900, 5925 MHz, etc.) or higher included in FR1 may include an unlicensed band. The unlicensed band may be used for various purposes, and may be used, for example, for vehicle communication (eg, autonomous driving).

TABLE 6

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, an example of a wireless device to which the present specification is applied will be described.

Figure 40:
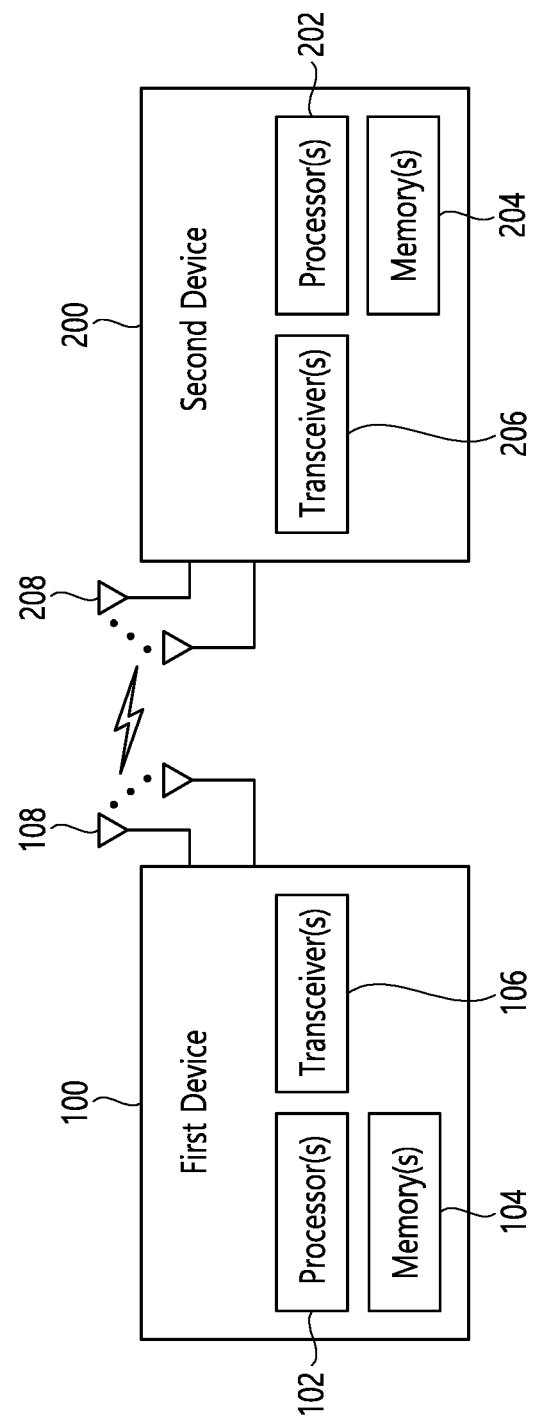
FIG. 40 illustrates a wireless device applicable to this specification.

FIG. 40 shows wireless devices, in accordance with an embodiment of the present disclosure.

Referring to FIG. 40, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 39.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 41:
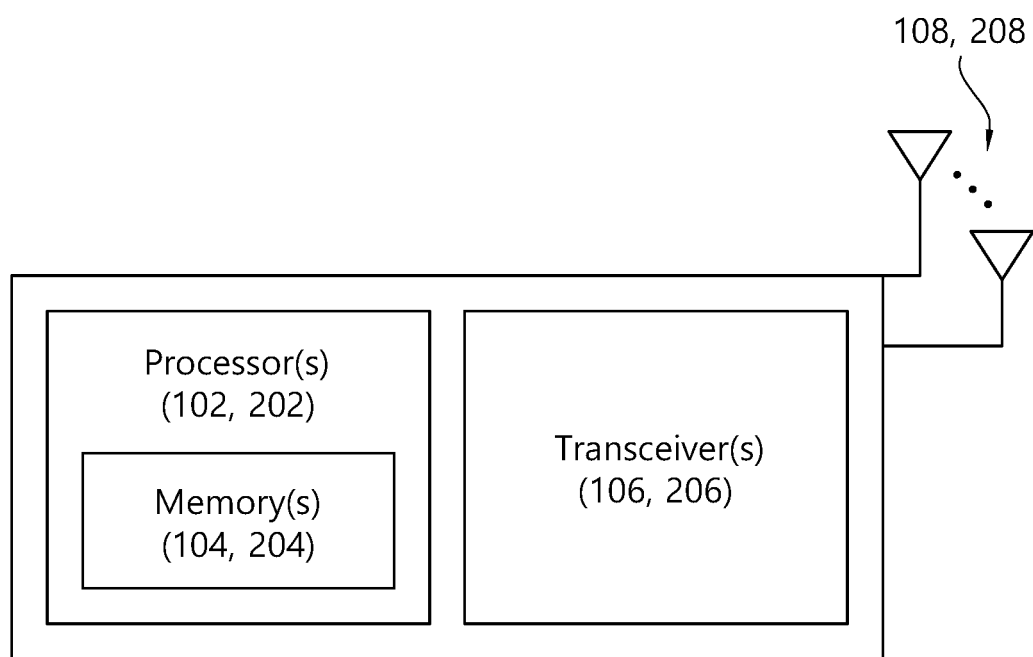
FIG. 41 shows another example of a wireless device that can be applied to this specification.

FIG. 41 shows another example of a wireless device that can be applied to this specification.

According to FIG. 41, a wireless device may include at least one processor (102, 202), at least one memory (104, 204), at least one transceiver (106, 206), and one or more antennas (108, 208).

As a difference between the example of the wireless device described above in FIG. 40 and the example of the wireless device in FIG. 41, in FIG. 40, the processors 102 and 202 and the memories 104 and 204 are separated, but in the example of FIG. 41, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present specification is applied will be described.

Figure 42:
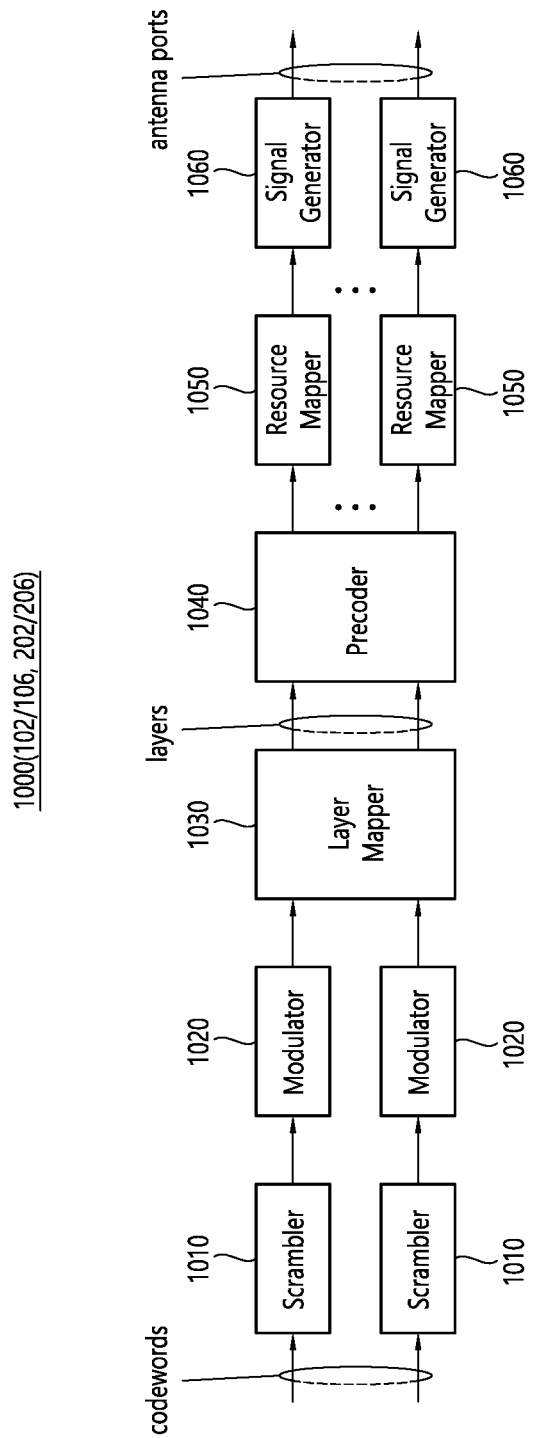
FIG. 42 illustrates a signal processing circuit for a transmission signal.

FIG. 42 shows a signal process circuit for a transmission signal, in accordance with an embodiment of the present disclosure.

Referring to FIG. 42, a signal processing circuit (1000) may include scramblers (1010), modulators (1020), a layer mapper (1030), a precoder (1040), resource mappers (1050), and signal generators (1060). An operation/function of FIG. 42 may be performed, without being limited to, the processors (102, 202) and/or the transceivers (106, 206) of FIG. 40. Hardware elements of FIG. 42 may be implemented by the processors (102, 202) and/or the transceivers (106, 206) of FIG. For example, blocks 1010–1060 may be implemented by the processors (102, 202) of FIG. 40. Alternatively, the blocks 1010–1050 may be implemented by the processors (102, 202) of FIG. 40 and the block 1060 may be implemented by the transceivers (106, 206) of FIG. 40.

Codewords may be converted into radio signals via the signal processing circuit (1000) of FIG. 42. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 42. For example, the wireless devices (e.g., 100, 200 of FIG. 40) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present specification is applied will be described.

Figure 43:
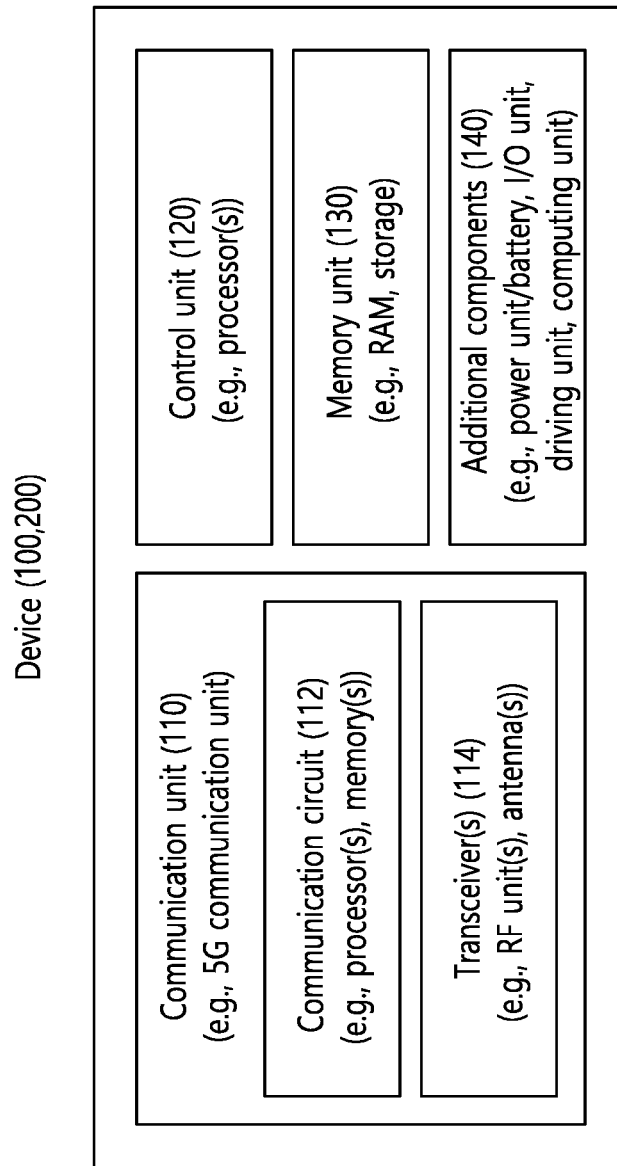
FIG. 43 shows another example of a wireless device applied to this specification.

FIG. 43 shows another example of a wireless device, in accordance with an embodiment of the present disclosure. The wireless device may be implemented in various forms according to a use-case/service (refer to FIG. 39).

Referring to FIG. 43, wireless devices (100, 200) may correspond to the wireless devices (100, 200) of FIG. 40 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 40. For example, the transceiver(s) (114) may include the one or more transceivers (106, 206) and/or the one or more antennas (108, 208) of FIG. 40. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 39), the vehicles (100*b*-1, 100*b*-2 of FIG. 39), the XR device (100*c* of FIG. 39), the hand-held device (100*d* of FIG. 39), the home appliance (100e of FIG. 39), the IoT device (100f of FIG. 39), a digital broadcast terminal, a hologram device, a public safety device, an MTC device, a medicine device, a fintech device (or a finance device), a security device, a climate/environment device, the AI server/device (400 of FIG. 39), the BSs (200 of FIG. 39), a network node, and so on. The wireless device may be used in a mobile or fixed place according to a use-example/service.

In FIG. 43, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 43 will be described in detail with reference to the drawings.

Figure 44:
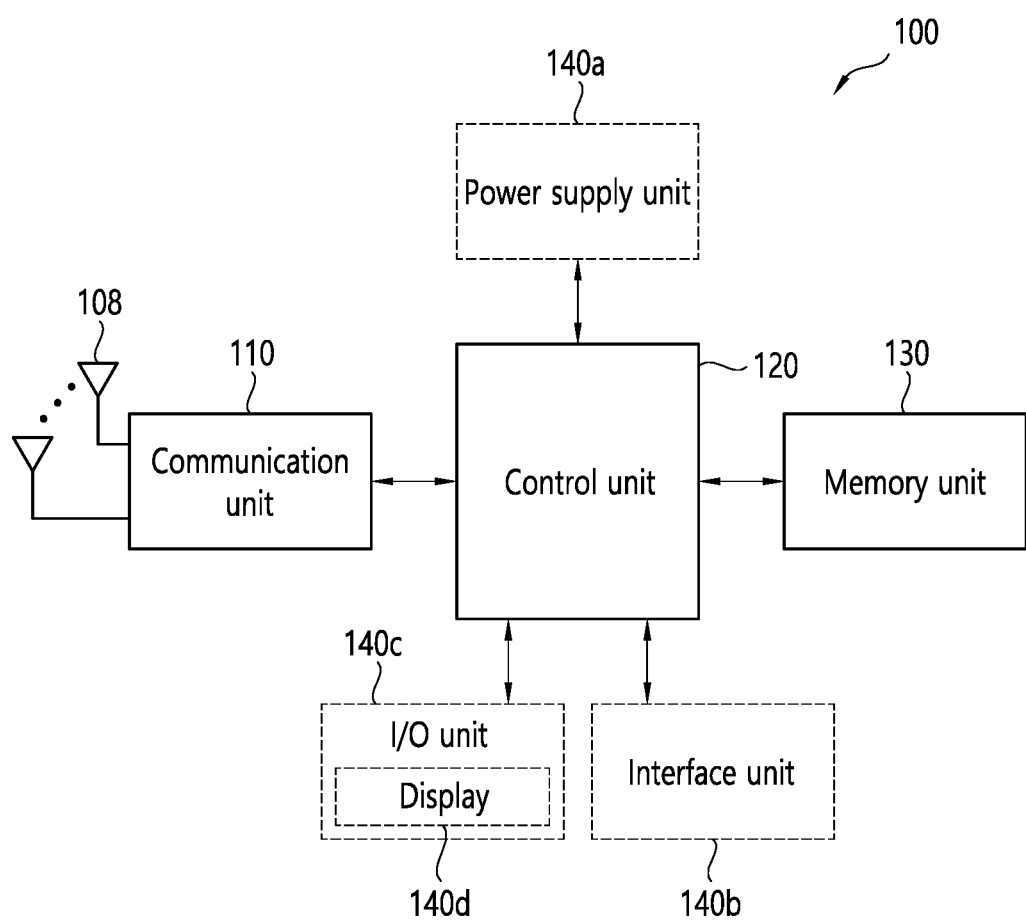
FIG. 44 illustrates a portable device applied to this specification.

FIG. 44 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 44, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 43, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (14b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 45:
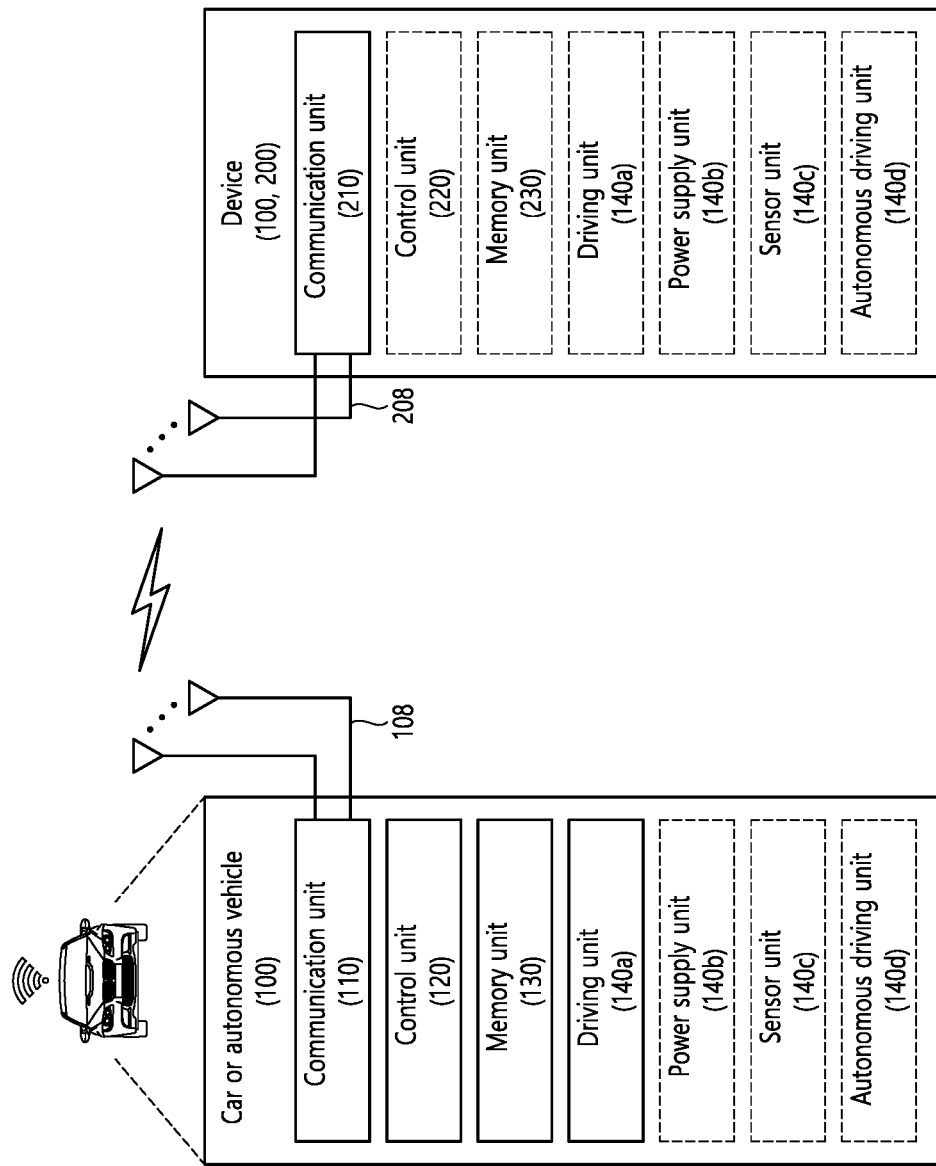
FIG. 45 illustrates a vehicle or an autonomous vehicle applied to this specification.

FIG. 45 shows a vehicle or an autonomous vehicle, in accordance with an embodiment of the present disclosure.

The vehicle or autonomous vehicle may be implemented by a mobile robot, a car, a train, a manned/unmanned Aerial Vehicle (AV), a ship, and so on.

Referring to FIG. 45, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 43, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 46:
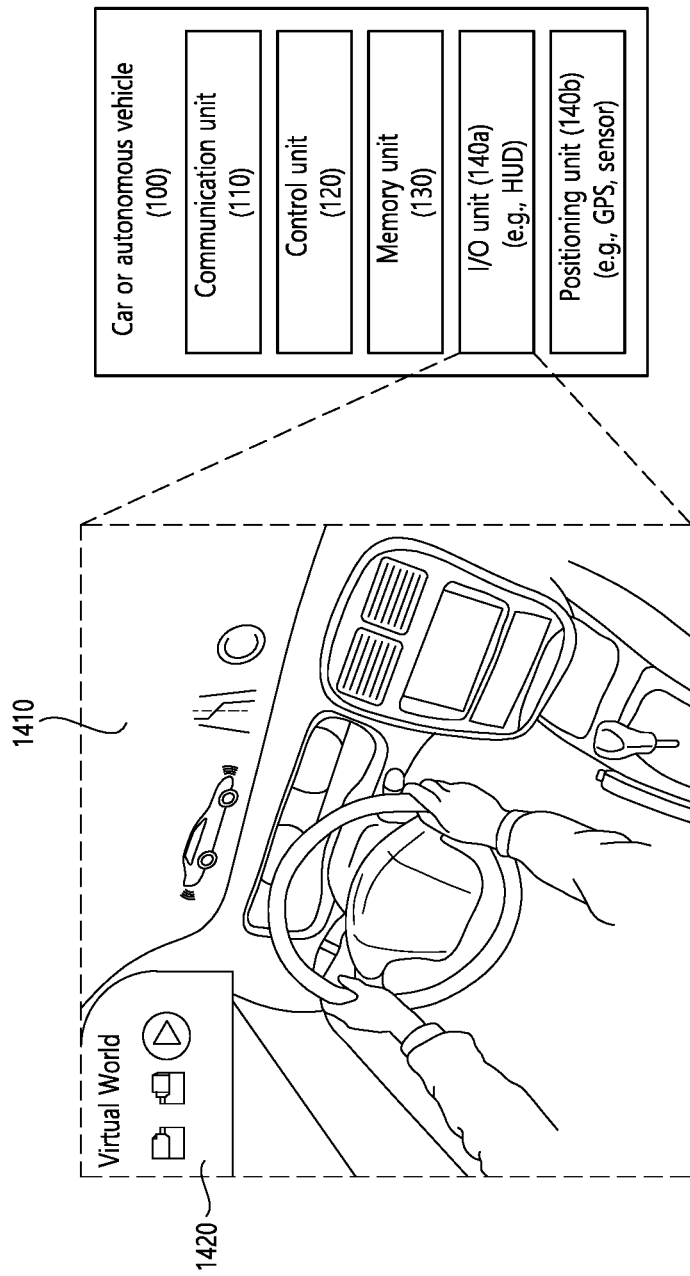
FIG. 46 illustrates a vehicle applied to this specification.

FIG. 46 shows a vehicle, in accordance with an embodiment of the present disclosure. The vehicle may be implemented as a transport means, an aerial vehicle, a ship, and so on.

Referring to FIG. 46, a vehicle (100) may include a communication unit (110), a control unit (120), a memory unit (130), an I/O unit (140*a*), and a positioning unit (140*b*). Herein, the blocks 110~130/140*a*~140*b* correspond to blocks 110~130/140 of FIG. 43.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include an HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 47:
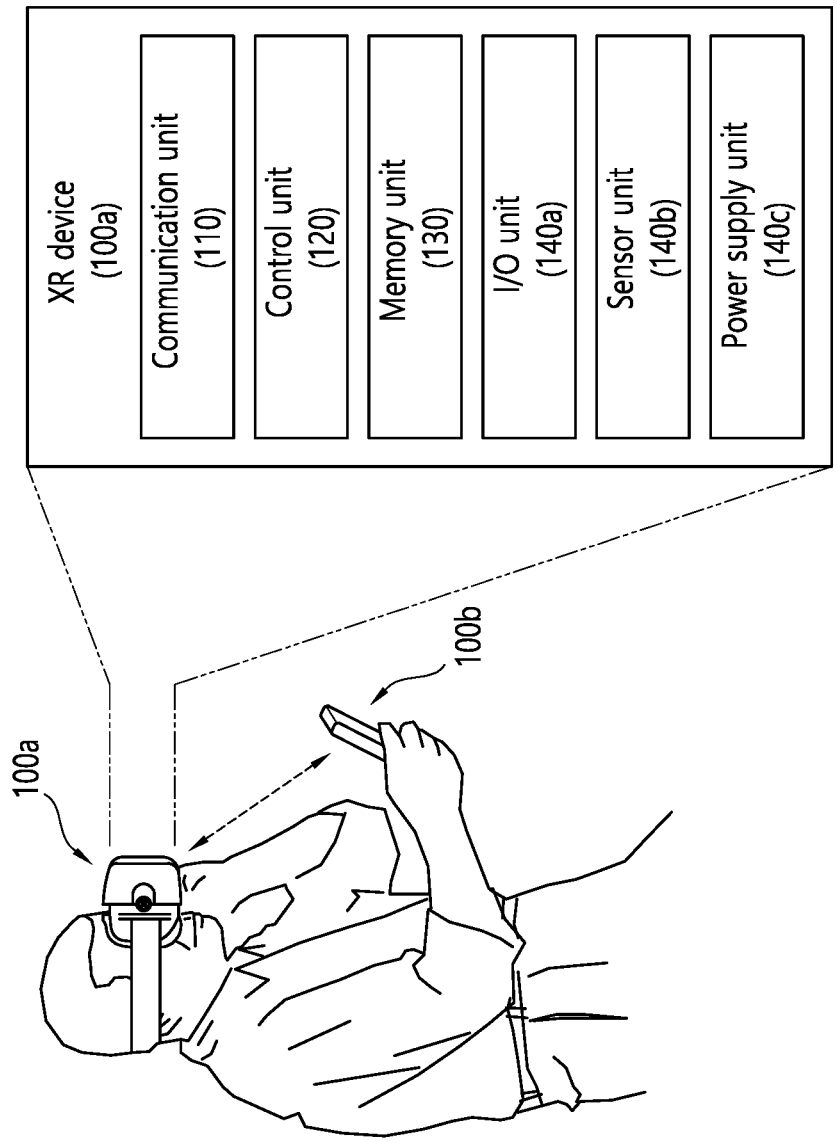
FIG. 47 illustrates an XR instrument applied herein.

FIG. 47 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 47, an XR device (100*a*) may include a communication unit (110), a control unit (120), a memory unit (130), an I/O unit (140*a*), a sensor unit (140*b*), and a power supply unit (140*c*). Herein, the blocks 110~130/140*a*~140*c* correspond to the blocks 110130/140 of FIG. 43, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device 100*b*) or a media server through the communication unit (130). The communication unit (130) may download/stream content such as films or news from another device (e.g., the hand-held device 100*b*) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100*b*) and generate and output an XR object corresponding to the hand-held device (100*b*).

Figure 48:
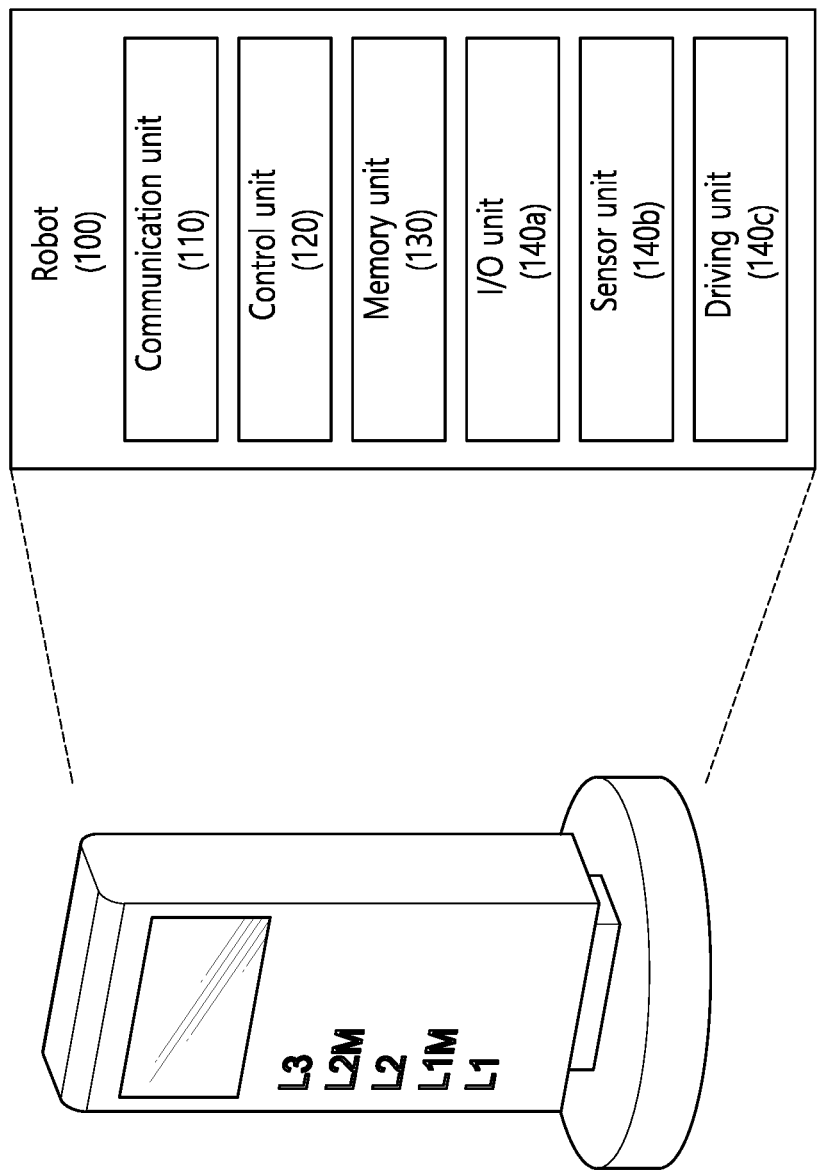
FIG. 48 illustrates a robot applied in this specification.

FIG. 48 shows a robot, in accordance with an embodiment of the present disclosure. The robot may be categorized into an industrial robot, a medical robot, a household robot, a military robot, and so on, according to a used purpose or field.

Referring to FIG. 48, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 43, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 49:
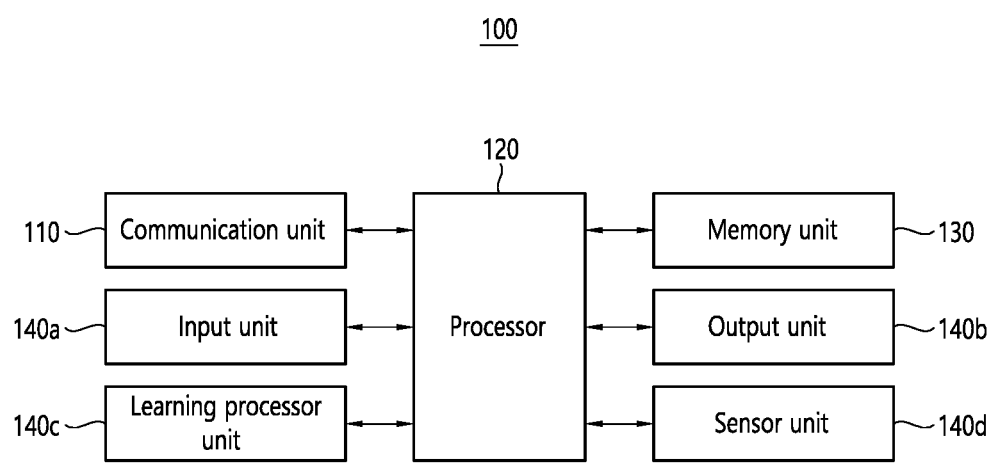
FIG. 49 illustrates an AI device applied to this specification.

FIG. 49 shows an AI device, in accordance with an embodiment of the present disclosure.

The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 49, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 43, respectively.

The communication unit (110) may transmit and receive wired/radio signals (e.g., sensor information, user input, learning models, or control signals) to and from external devices such as other AI devices (e.g., 100x, 200, 400 of FIG. 39) or an AI server (e.g., 400 of FIG. 39) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 39). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 40). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for correcting an error in a quantum communication system, the method performed by an apparatus and comprising:
    transmitting a random access (RA) preamble to another apparatus;
    receiving a random access response (RAR) from the another apparatus in response to the RA preamble;
    performing a radio resource control (RRC) connection procedure with the another apparatus; and
    transmitting data to the another apparatus, wherein the data is encoded based on key information,
wherein the key information is distributed between the apparatus and the another apparatus based on that:
the error is measured based on a test pulse; and
the error is corrected using an improved Faraday rotation mirror of the apparatus.

2. The method of claim 1, wherein the test pulse is a pulse generated by the another apparatus and received by the apparatus from the another apparatus.

3. The method of claim 1, wherein the test pulse is a pulse generated by the apparatus.

4. The method of claim 1, wherein a value of the error is determined based on a magnitude of a test pulse and a magnitude of a component detected by an optical sensor of the apparatus.

5. The method of claim 4, wherein the magnitude of the component detected by the optical sensor is determined based on that:
the test pulse passes through a polarizer,
a pulse passing through the polarizer is reflected on the improved Faraday rotating mirror,
the reflected pulse passes through the polarizer again, and
a component that has passed through the polarizer again is detected by the optical sensor.

6. The method of claim 4, wherein the value of the error is determined based on the following equation, $$\epsilon = \sin\char`\^(-1)(E\_e/E\_T)$$

wherein the & is the value of the error,
wherein the E_e is a value for the magnitude of the component detected by the optical sensor, and
wherein the E_T is a value for the magnitude of the test pulse.

7. The method of claim 1, wherein the improved Faraday rotation mirror is an element with more solenoids than legacy Faraday rotation mirror.

8. The method of claim 7, wherein the error is corrected based on adjusting a strength of a current of the solenoid.

9. The method of claim 8, wherein a value of the current is determined based on at least one of the value of the error, a permeability of a medium, a Verde constant, or a total number of wires.

10. The method of claim 7, wherein the legacy Faraday rotation mirror is an element comprising a mirror and a Faraday rotor composed of a permanent magnet.

11. The method of claim 1, wherein the apparatus shares information about a time resource for a correction with the another apparatus through an existing communication network.

12. The method of claim 11, wherein the time resource for the correction includes a resource for transmitting a test pulse through a quantum channel.

13. An apparatus comprising:
a transceiver;
at least one memory; and
at least one processor operably coupled with the at least one memory and the transceiver, wherein the at least one processor is configured to:
control the transceiver to transmit a random access (RA) preamble to another apparatus;
control the transceiver to receive a random access response (RAR) from the another apparatus in response to the RA preamble;
perform a radio resource control (RRC) connection procedure with the another apparatus; and
control the transceiver to transmit data to the another apparatus,
wherein the data is encoded based on key information,
wherein the key information is distributed between the apparatus and the another apparatus based on that:
an error is measured based on a test pulse; and
the error is corrected using an improved Faraday rotation mirror of the apparatus.

14. An apparatus comprising:
at least one memory; and
at least one processor operably coupled to the at least one memory, wherein the at least one processor is configured to:
control a transceiver to transmit a random access (RA) preamble to another apparatus;
control the transceiver to receive a random access response (RAR) from the another apparatus in response to the RA preamble;
perform a radio resource control (RRC) connection procedure with the another apparatus; and
control the transceiver to transmit data to the another apparatus,
wherein the data is encoded based on key information,
wherein the key information is distributed between the apparatus and the another apparatus based on that:
an error is measured based on a test pulse; and
the error is corrected using an improved Faraday rotation mirror of the apparatus.

* * * * *